US009426140B2

(12) United States Patent
Palmeri et al.

(10) Patent No.: US 9,426,140 B2
(45) Date of Patent: Aug. 23, 2016

(54) FEDERATED AUTHENTICATION OF CLIENT COMPUTERS IN NETWORKED DATA COMMUNICATIONS SERVICES CALLABLE BY APPLICATIONS

(71) Applicant: LAYER, INC., San Francisco, CA (US)

(72) Inventors: Ron Palmeri, San Francisco, CA (US); Tomaz Stolfa, San Francisco, CA (US); Andrew H. Vyrros, San Francisco, CA (US); Don Fletcher, San Francisco, CA (US)

(73) Assignee: LAYER, INC., San Francisco, CA (US)

( * ) Notice: Subject to any disclaimer, the term of this patent is extended or adjusted under 35 U.S.C. 154(b) by 0 days.

(21) Appl. No.: 14/481,590

(22) Filed: Sep. 9, 2014

(65) Prior Publication Data

US 2015/0074407 A1 Mar. 12, 2015

Related U.S. Application Data

(60) Provisional application No. 61/875,562, filed on Sep. 9, 2013.

(51) Int. Cl.
 *H04L 29/06* (2006.01)
(52) U.S. Cl.
 CPC ....... *H04L 63/0807* (2013.01); *H04L 63/0823* (2013.01); *H04L 63/166* (2013.01); *H04L 63/0428* (2013.01)
(58) Field of Classification Search
 CPC ............... G06F 21/33; H04L 63/0807; H04L 63/0823; H04L 63/166; H04L 63/0428
 USPC ................................................. 713/168, 171
 See application file for complete search history.

(56) References Cited

U.S. PATENT DOCUMENTS

| 2006/0048216 A1* | 3/2006 | Hinton | H04L 63/0815 726/8 |
| 2006/0165060 A1* | 7/2006 | Dua | G06Q 20/20 370/352 |

(Continued)

OTHER PUBLICATIONS

Korean Intellectual Property Office, "Search Report" in application No. PCT/US2014/054805, Dated Dec. 5, 2014, 12 pages.

(Continued)

*Primary Examiner* — Yogesh Paliwal
(74) *Attorney, Agent, or Firm* — Hickman Palermo Becker Bingham LLP

(57) ABSTRACT

A data processing method providing improved and efficient authentication of client computers by server computers, the method comprising: using authentication logic of a server computer, establishing a secure socket connection with a client computer; receiving, from the client computer, a request to use a communications service that is implemented at the server computer, and in response to the request, determining that the client computer is unauthenticated; providing a nonce value to the client computer; receiving from the client computer an encrypted identity token that includes the nonce and a user identifier, wherein the identity token has been encrypted using a provider computer and an encryption key of the provider computer, wherein the encryption key is known at the server computer; validating the identity token and obtaining the user identifier therein; creating and storing a session token that is uniquely associated with the client computer and that includes a session identifier, the user identifier, and a binding to the secure socket connection.

18 Claims, 17 Drawing Sheets

(56) References Cited

U.S. PATENT DOCUMENTS

| | | |
|---|---|---|
| 2008/0235513 A1 | 9/2008 | Foster et al. |
| 2009/0037997 A1* | 2/2009 | Agbabian ............ H04L 63/166 726/10 |
| 2010/0211780 A1* | 8/2010 | Mukkara ............ H04L 63/0823 713/168 |
| 2010/0299525 A1 | 11/2010 | Shah et al. |

OTHER PUBLICATIONS

Claims in application No. PCT/US2014/054805, dated Dec. 2014, 5 pages.

* cited by examiner

FIG. 3

```
Client                                    Server
  |---- Protocol init ---->|
  |<--------- Ok ----------|
  |
  |------- Auth --------->|
  |<--------- Ok ----------|
  |
  |----- Channel add ---->|
  |<--------- Ok ----------|
  |
  *Stream available*
  |
  |------ Send frame ----->|
  |           . . .
```

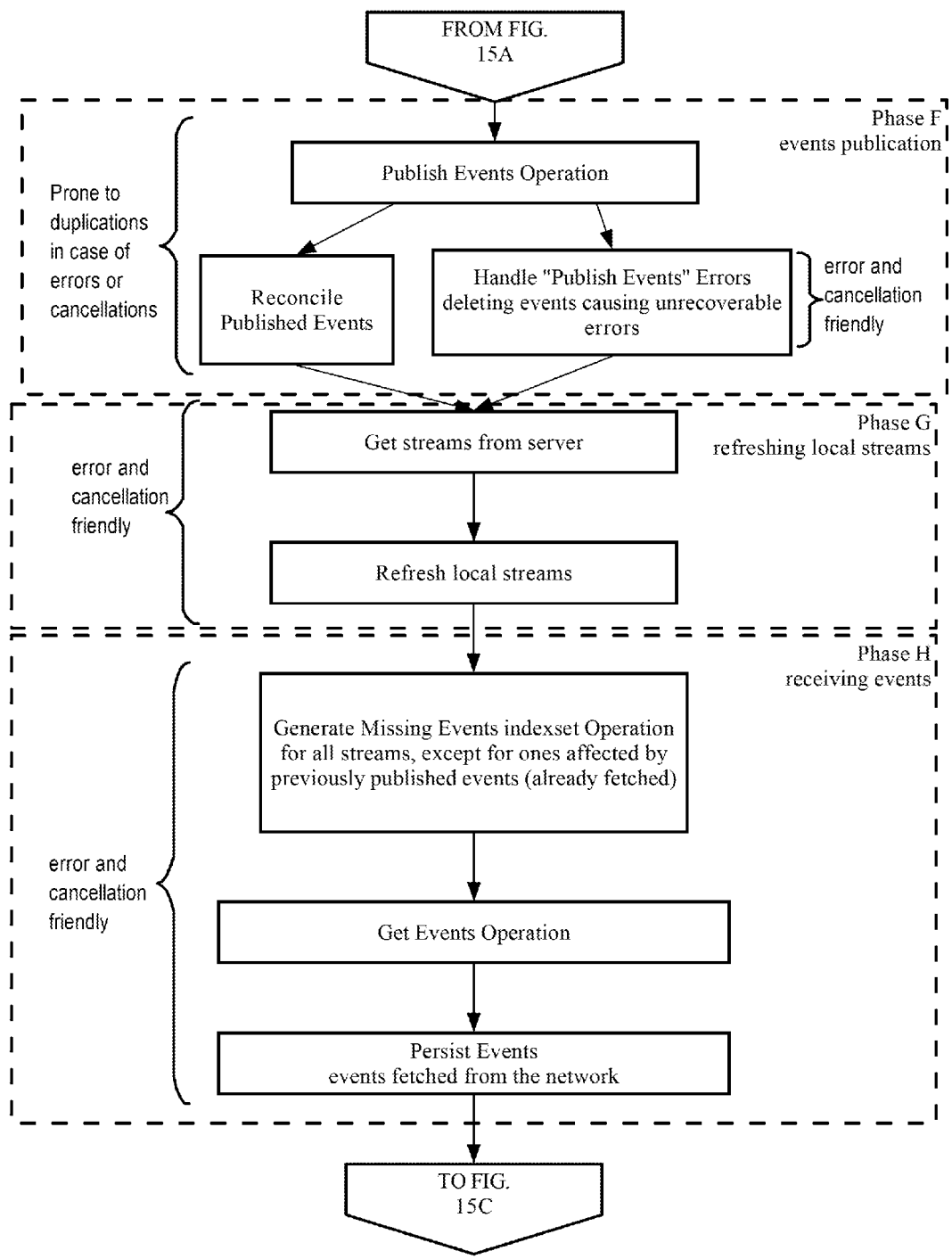

US 9,426,140 B2

FEDERATED AUTHENTICATION OF CLIENT COMPUTERS IN NETWORKED DATA COMMUNICATIONS SERVICES CALLABLE BY APPLICATIONS

BENEFIT CLAIM

This application claims the benefit under 35 U.S.C. §119 (e) of provisional application 61/875,562, filed Sep. 9, 2013, the entire contents of which are hereby incorporated by reference for all purposes as if fully set forth herein.

FIELD OF THE DISCLOSURE

The present disclosure relates to improved data processing in the fields of electronic messaging services and computer program application development. The disclosure relates more specifically to networked data communications services on server computers that can be called by remote applications on mobile computing devices to invoke messaging or communications functions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer program applications or "apps" for mobile computing devices such as smartphones, tablet computers, and other devices have become ubiquitous. Many of these apps provide substantive functions that use, as foundation, various forms of electronic messaging including SMS text, e-mail messages, messages using proprietary messaging protocols, notifications and alerts, and/or voice calls. Indeed, one main reason that the number and utilization of apps have skyrocketed is the social communication possibilities that portable computing devices permit.

However, in past approaches, developing apps with messaging and voice call capabilities has been time-consuming and difficult. For example, assume that a particular app permits a pair of users to indicate affinity for one another and then communicate after mutual indication of affinity. In the past, setting up a messaging capability for this type of app has required the app developer to re-implement foundation elements such as message buffers, message delivery protocols, failure handling, and other processes that are essential to having a reliable, useful, workable messaging function. Re-implementation of these functions typically requires a large, highly skilled team of software developers, considerable time to code, test, and debug the foundation functions, and significant computing resources to support the functions. When thousands of developers are working on thousands of different apps, this process is not scalable.

Past approaches have provided application programming interfaces that provide abstracted access to call processing functions of telephone service providers such as Verizon and AT&T; an example is TWILIO.

SUMMARY OF DISCLOSURE

The appended claims may serve as a summary of the disclosure.

BRIEF DESCRIPTION OF DRAWINGS

In the drawings:

FIG. 3 illustrates a successful authenticated handshake.

FIG. 15A, FIG. 15B, FIG. 15C collectively comprise a three-view flow diagram illustrating dependencies in synchronization operations.

DETAILED DESCRIPTION OF EXAMPLE EMBODIMENTS

Figure 1:
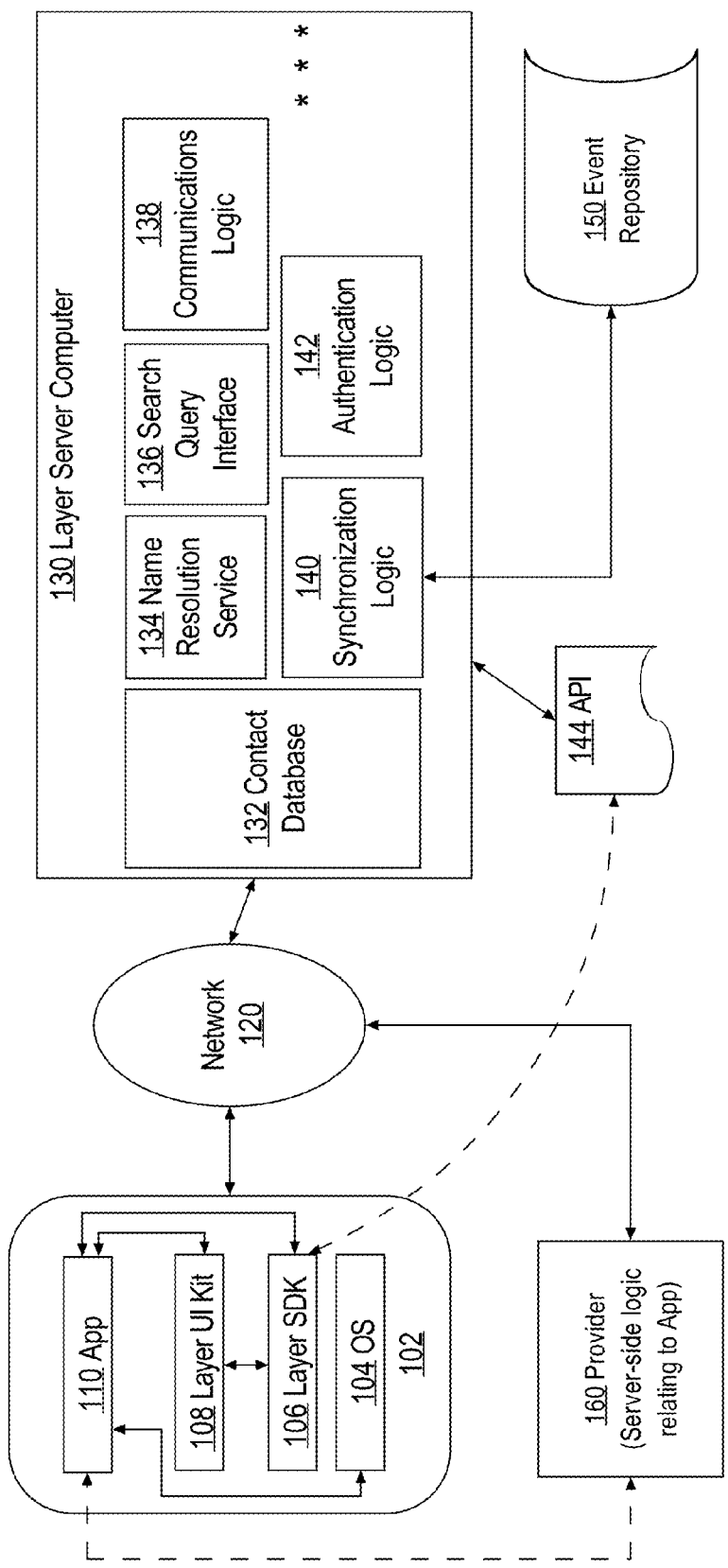
FIG. 1 illustrates a networked computer system that is configured according to an embodiment and includes an improved name resolution service, synchronization logic and authentication logic.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

As one embodiment, the disclosure describes an open communications layer for the internet that operates cross-platform and free from an advertising supported business model. Developers who have tried to build rich, secure, scalable communications in their products know that it's extremely hard to do right. Solving authentication, security, sync, offline messages, push notifications and a plethora of other problems is a challenge by itself. Required infrastructure such as CPU and storage resources are immensely difficult to build and expensive to set up on a high-performance, global basis. While companies like Google, Facebook, Apple and Microsoft have spent millions of dollars and deployed huge teams to create global infrastructure, the cost is that their services are not open, are platform dependent, or rely on advertising for profitability.

In an embodiment, the disclosure provides computer-implemented services that can make rich, secure, scalable communications easier. In an embodiment, an open communications layer for the Internet enables the power of communications to be used in any mobile or web product. Designed for use by software developers, certain embodiments provide foundation communication services such as rich messaging, voice and video calls so that developers can focus on the core of their products.

In one embodiment, these communications services are implemented using a set of user interface services for direct use by developers and that are coupled to a software development kit (SDK) that interfaces to supporting services that are implemented using public data centers or cloud service providers. Thus, an embodiment can be implemented as a full-stack communications service for application developers. Each of the components of the software stack, such as the SDK, API, and cloud services, are configured to work together. In past approaches, for example, a signaling service might provide only a connection from a server to a client that allows real-time messaging, voice or video transfer, but a developer aiming to use this service to power communications in an app would be required to build the entire client-side stack, design a synchronization solution, build offline messaging support, and find a way to handle both authentication and push notifications. Once these elements have been created, the greater challenge is making them all work together. In sharp contrast, the disclosure herein provides a complete, end-to-end, turnkey communications solution for developers, or a "full-stack service," that allows for the addition of messaging, voice and video to any mobile or web application.

Embodiments are described herein according to the following outline:
1. OVERVIEW
2. NAME RESOLUTION SERVICE
3. MESSAGE COMMUNICATION FUNCTIONS
   3.1 OVERVIEW
   3.2 IMPLEMENTATION EXAMPLE—APPLE IOS
   3.3 TRANSMISSION DESIGN; TRANSMISSION PROTOCOL
   3.4 SYNCHRONIZATION DESIGN
4. AUTHENTICATION LOGIC AND PROTOCOL
5. VOIP KIT
6. USER INTERFACE KIT
7. IMPLEMENTATION EXAMPLE—HARDWARE OVERVIEW 1. Overview FIG. 1 illustrates a networked computer system that is configured according to an embodiment and includes an improved name resolution service, synchronization logic and authentication logic. In an embodiment, networked callable communications services are implemented using server computer logic hosted in a networked computer acting as a server, and using client computer logic that is co-hosted with and callable using an application program or "app" hosted on a mobile computing device. In the example of FIG. 1, a mobile computing device 102 is coupled through one or more networks 120 to a server computer 130. In various embodiments, the mobile computing device 102 may comprise a smartphone, tablet computer, laptop computer, netbook, ultrabook, or desktop computer. For purposes of illustrating a clear example, in FIG. 1 a single device 102 is shown, but other embodiments may use any number of such devices and embodiments specifically configuring Layer server computer 130 to support thousands or millions of devices.

In one embodiment, the techniques herein may be implemented in client-side logic and server-side logic that is associated with a set of services denoted "Layer". The label "Layer" is used solely to indicate that certain elements of the system disclosed herein are unlike prior approaches and related to a full stack of communications services. However, the use of the label "Layer" is not required in an embodiment or implementation.

In an embodiment, mobile computing device 102 comprises an operating system 104, a software development kit (SDK) 106, a user interface (UI) kit 108, and an application or "app" 110. "Kit," in this context, refers to a collection of logic, programmed methods, routines, programs, or other software elements, or a combination with hardware or firmware logic elements. In an embodiment, the OS is configured to manage processes, applications, storage, and I/O resources of the device 102. The mobile computing device 102 may host or execute any of the APPLE IOS, ANDROID, WINDOW MOBILE or web-oriented operating systems or platforms. In an embodiment, the SDK 106 comprises logic that is configured to perform the client-side functions that described further herein relating to messaging, voice, video, and similar infrastructure functions. In certain embodiments, the SDK 106 may be developed against or linked into any appropriate communications app as a foundation layer for accessing the communications-related functions that are provided in the server computer logic. In other embodiments, the SDK 106 may comprise a non-linked library that is accessible using well-known or published calls or method invocations as described in an application programming interface (API).

In an embodiment, the UI kit 108 comprises logic that is configured to implement user interface display widgets or other functions for purposes of presentation consistency across apps that use the SDK 106; in some embodiments, the use of the UI kit is optional.

In an embodiment, app 110 comprises logic that is configured to implement any of a variety of substantive applications that may be useful or entertaining for a user of the device 102. Examples include social media apps, sports apps, reading or information retrieval apps, financial apps, or apps that relate to any other form of human interest or endeavor.

In an embodiment, network 120 broadly represents one or more local area networks, wide area networks, internetworks or internets, and includes connectivity apparatus such as wireless access points, aggregation routers, switches, and the like. Links between devices 102 and network 120 may be wired or wireless and may use terrestrial, satellite, microwave or other links.

In an embodiment, server computer 130 comprises server computer logic that is configured to perform the server-side functions described herein relating to messaging, voice, video, and similar infrastructure functions. In an embodiment, the server computer 130 may be implemented using any number of processors, computers, or virtual machine instances, in a data center or using a cloud computing center in which instances may be created and removed on demand and in response to processing needs. Thus, server computer 130 in FIG. 1 broadly represents one or more virtual machine instances and/or one or more general purposes server computers hosting stored control programs and/or special-purpose computers that are configured as described herein.

App 110 also may have a client-server relationship to a Provider 160, which comprises one or more computers typically associated with a developer of the app 110 and coupled to the network. As further described herein, Provider 160 may provide selected server-side authentication functions that enable establishing a trust relationship with the app 110 and delivering an identity token to the app that enables the app to prove its trustworthiness to the server computer 130.

In an embodiment, server computer 130 comprises a contact database 132, name resolution service 134, search query interface 136, communications logic 138, synchronization logic 140 and authentication logic 142. As indicated by the characters "* * *" in FIG. 1, the server computer 130 may comprise other functional units or different functional units in other embodiments, and the contact database 132, name resolution service 134, search query interface 136 and communications logic 138 shown in FIG. 1 merely represent examples of services that could be provided. For purposes of illustrating a clear example, in this description all such services may be termed collectively "server computer logic" or "server communications logic". Server computer 130 may be coupled to an application programming interface (API) 140 that exposes callable methods or functions of the elements within the server computer, and coupled to an event repository 150 that is configured as a data store for events, messages, and records of other information to support functions of the system, as further described.

In an embodiment, the contact database 132 is configured to receive, store, and respond to queries relating to contact data records that comprise data relating to persons or other entities such as businesses. In an embodiment, the name resolution service 134 is configured to receive and respond to queries that provide a first kind of identifier of a person or entity, and request resolution into a second kind of identifier; the operation of an example name resolution service is described further herein in a separate section. In an embodiment, the search query interface 136 is configured to receive and respond to queries for message metadata relating to aspects of text messages, email messages, voice calls or video calls that are processed using the system.

In an embodiment, the communications logic 138 implements a variety of message and call processing functions that are callable by the SDK 106 according to one or more specified protocols. Example functions include: sending messages; receiving messages; making calls; receiving calls; importing contacts; adding contacts; updating a contact; receiving contact updates; and others as described herein.

In an embodiment, server computer 130 comprises an API 140 that provides programmatic access to the contact database 132, name resolution service 134, search query interface 136 and communications logic 138 for external computers, systems, services or applications that cannot or do not use SDK 106 to call functions of the server computer 130. Examples include external social networking services, email services, server computer-based applications, and others.

Synchronization logic 140 is configured to perform synchronization of information, such as messages, across a plurality of different computing devices that are associated with the same account or user. For example, the developer of the app 110 can include calls to synchronization services implemented in synchronization logic 140 to permit that particular app to synchronize its events, alerts, or other messages across multiple different end-user devices, without the developer having to write a synchronization service from scratch.

Authentication logic 142 is configured to perform authentication of users, devices or accounts to the server computer 130 and/or to back-end server computers that are specifically associated with the app 110. For example, the developer of the app 110 can include calls to authentication services implemented in authentication logic 142 to permit that particular app to authenticate users to a back-end server, without the developer having to write an authorization service from scratch.

With the approach herein, app developers can integrate sophisticated and complex communications capabilities into their apps without having to re-implement functions such as messaging, call establishment, etc. Thus, an app developer may use relatively few lines of code to call functions of an API or SDK that logically call corresponding methods of the server computer logic, and thereby perform complex actions without re-implementation.

Example functions include: authentication; security; synchronization of data on an app of a mobile computing device to data managed by a corresponding application on an application server computer or virtual machine instance; message buffering, offline message delivery, assured message delivery, changing the state of messages as they flow through the network, and other functions relating to messaging infrastructure; and management of offline messages that are sent or received when a mobile computing device is temporarily disconnected from a network.

In various embodiments, these functions may be implemented for communications through text, voice, and video including any of such communications in a manner that is marked on the record or off the record. In this context, an off-the-record message means a message that is encrypted using credentials known only to the calling app so that the message content is not readable or capable of indexing by the server computer logic. Messaging functions may include: sending messages; receiving messages. Voice call functions may include: making calls; receiving calls. Contact management functions may include: importing contacts.

The approaches contemplated herein are highly scalable by using a cloud computing infrastructure, and permit app developers to focus on the distinguishing substantive functions of their apps rather than investing significant time in implementing messaging infrastructure. Instances of the first element of communications logic may be deployed on virtual machine instances that are located in any of multiple different geographically distributed regions.

In certain embodiments, the communications logic is configured to interoperate with network-connected services other than telephone communications services. Examples of such network-connected services include FACEBOOK, GMAIL, YAHOO! Mail, and other external services. The communications logic provides a separate set of infrastructure services that are particularly useful for mobile devices, for messaging, for peer to peer voice and video, and similar applications.

Example services include: Intra-app communication: app developers can add in-app communication between users of their app. Messaging, voice, video, media; Inter-app communication: users can communicate across apps; Address book cleanup: clean up a user's address book on import into an app; External messaging integration: send messages over external services such as Google and Facebook.

Examples of data collection sources include: Address books; Apps-devices-person associations (which apps using the SDK are installed on which devices for a specific person.); Intra-app communications; Inter-app communications; External messaging communications; VoIP call history; Media shared.

Examples of benefits that may be obtained using various embodiments include: Address book cleanup; Contact ranking: who's important to me?; fraud detection ranking/service; Insight into media distribution: who's sharing, how does media spread?

In an embodiment, the publish data to topic streams. Current and future services will consume data by topic. These services can be real-time or batch oriented. With this approach, some embodiments can provide a consistent interface for producing and consuming data system-wide. New services that produce or consume data can be introduced with no impact to existing services.

In an embodiment, logic implementing the services is a self-contained unit, separated from the core messaging infrastructure. An embodiment may include a record keeping utility for storage of information about people, relevant to communication. Embodiments may include a global store across all applications. In some embodiments, there is no distinction between accounts and contacts. In some embodiments, original data is never changed to promote accountability. In some embodiments, the processed data is in a usable format for various use cases such as disambiguation or address resolution. In some embodiments, the data store holds all addresses for a person including all local addresses. Embodiments may be implemented as a distributed, highly available service.

2. Name Resolution Service 2.1 Overview

Figure 2:
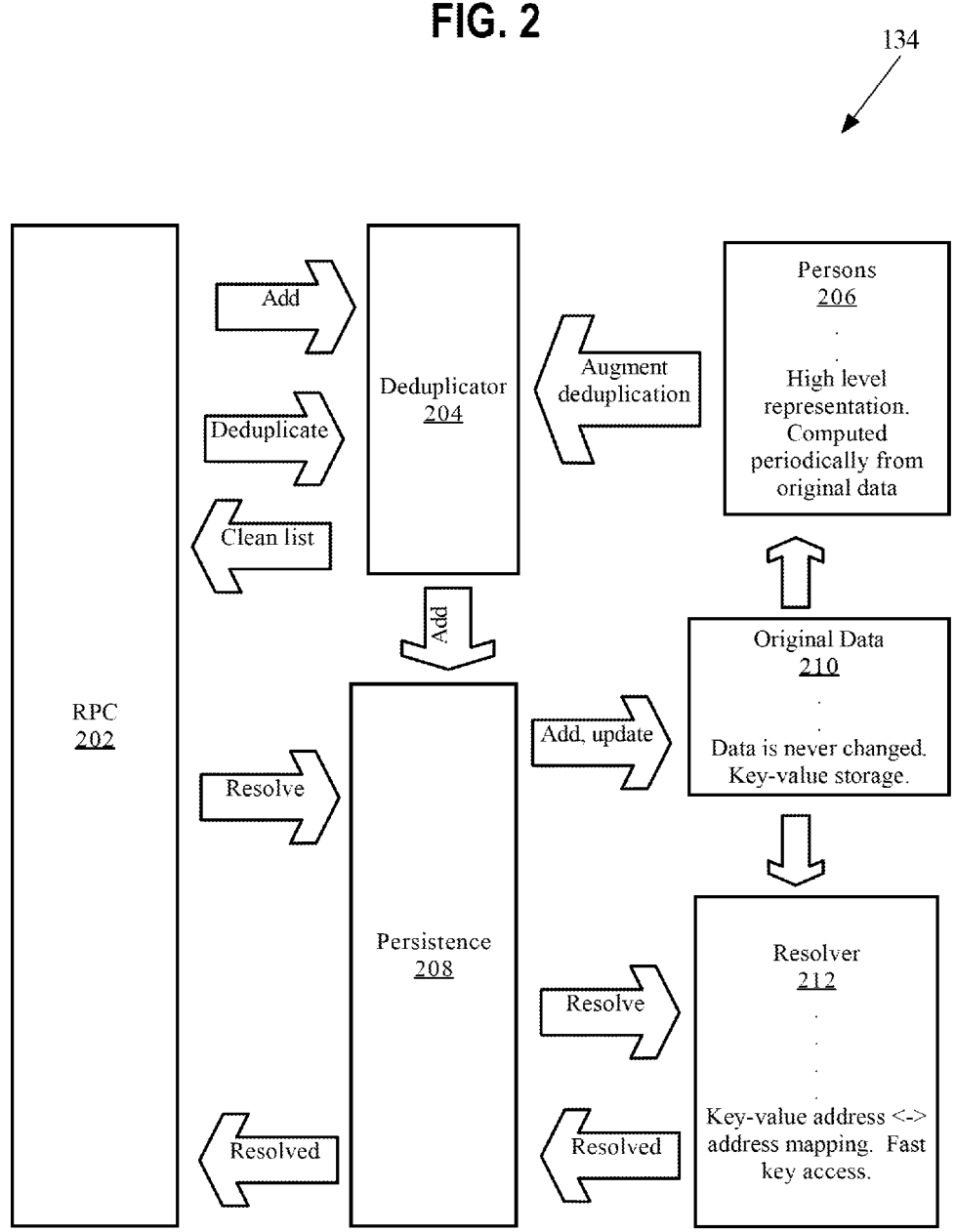
FIG. 2 illustrates one embodiment of a name resolution service.

FIG. 2 illustrates one embodiment of name resolution service 134 (FIG. 1). As the description herein details, the name resolution service 134 is configured to receive request messages that include partial identifying information for a device or a person and to return records identifying other identifying information for the same device or person. Over time, the name resolution service 134 is configured to build a database that consistently identifies particular individuals across multiple devices and identities.

In an embodiment, name resolution service 134 comprises a system that collects and disambiguates digital representations of people that use, or become known through use of, the other services described herein. It stores all available information typically associated with a person, such as their name, aliases (nickname), addresses (digital and physical), age, and/or other values. The system is aware of relationships between persons. Essentially it is an interlinked global address book of the system. In an embodiment, name resolution service 134 supports a Global "White Pages" and "Yellow Pages" services where a person can claim and manage their person identity—choosing which elements to make globally visible and those that another person must already know in order to name resolve from that unique identifier. For example, a user could communicate to the system and configure records to provide, I would like to be known by my TWITTER handle, but someone would need to know my email address in order to associate it with me.

In an embodiment, name resolution service 134 is configured as a globally distributed recursive hierarchical cache that provides fast, secure name resolution with a policy framework such as OpenDNS. Referring again to FIG. 2, the name resolution service 134 principally operates on original data 210, which may be stored in key-value pairs in repository 150. Original data 210 may be obtained from a variety of sources including explicit user account enrollments, contact files in mobile devices, address books in e-mail client programs, and so forth. A persons table 206 is periodically configured from the original data and includes a high-level representation of individuals, stored in a secure table of repository 150; records in the persons table serve as a first-level source of information about what person the original data represents. A deduplicator 204 is configured to remove duplicate records from the repository 150 as new records are received in requests or entered into the original data 210. After deduplication, records may be added to the repository 150 via a persistence layer 208 that is responsible for persistent data storage and retrieval.

A resolver 212 is coupled to the persistence layer 208 and receives input from the original data 210. In an embodiment, resolver 212 is configured to receive a resolution request from persistence layer 208 identifying one or more sets of data relating to a user, account or device, and to reply with resolved entity data that indicates an entity to which the data relates and a confidence score indicating a relative confidence level that the entity is truly indicative of the set of data that was received. In one embodiment, a remote procedure call (RPC) service 202 acts as an interface to other elements of the server computer 130 for the purpose of receiving requests from the client logic or other elements of the server logic and transferring requests and responses to the other elements shown in FIG. 2.

In one embodiment, name resolution service 134 implements the following system operations.

list<match> add(list<person> entries): Adds a list (at least 1) of people to the global persons store. Deduplicates entries within this list. Returns: Potential duplicates of supplied persons paired with probability of a match list<match> deduplicate(list<person> existing, list<person> new): Deduplicates persons within to list 'new' and in the union of lists 'new' and 'existing' Entries in 'existing' take precedence before entries in 'new', meaning in the event of a match, the entry in 'existing' is kept and the one from 'new' is discarded. Returns: Potential duplicates of supplied persons paired with probability of a match string resolve(string address): For a given address, return the global unique id.

As one example of use, assume that a user imports their list of contacts into the app local address book database. All contacts (new and existing or just new) are passed over to the name resolution service 134 for deduplication. All new contacts and returned matches are stored in the address book database. Ideally the app developer displays the results to the user to be merged or merges them behind the scenes based on a calculated probability that they are associated.

In one embodiment, the following data structures are implemented in the context of a multitiered data storage unit having three (3) tiers. Tier 1 comprises raw data that is considered immutable. Tier 2 comprises deduplicated records of persons that are computed in bulk from raw data. Tier 3 comprises a key-value store for address resolution.

PERSON: Represents a person known to the system. TABLE 1 presents code for an example definition of a person structure.

TABLE 1

PERSON DATA

```
{
    'id': 'UUID',
    'first_name': 'String',
    'fn_metaphone': 'String',
    'last_name': 'String',
    'ln_metaphone': 'String',
    'addresses': [
        {
            'type': 'layer/email/phone/fb/...',
            'value': 'the address',
            'verified': true/false,
        } ],
    'gender': 'm/f',
    'location': 'TBD',
    'birthday': 'date',
    'devices': ['TBD - unique id,
        type, (list) Layer app ids'],
}
```

Note: address may contain extra fields depending on the type. For example, a phone number type. Note: The idea behind storing devices globally for each person in to aid in security.

Queries: fetch persons where address in list of addresses; fetch person where last name like somename (like defined as required by the deduplication algorithm); fetch persons where id in list of identifiers.

ADDRESS: defines address type. Type can be: system, email, phone, physical. Value: The address itself. –accountId+appId for system addresses–E164 for phone–email–any string for physical address. Verified (optional): true if the address's ownership was verified somehow (by system or by a trusted third party).

RELATIONSHIPS: Relationships between persons stored in the datastore are represented and accessed using a graph. Relationships are e supplemented with edges based on communication patterns between persons, calculated periodically offline based on logs stored in various layer applications.

In an embodiment, the communications logic implements a comprehensive form of name resolution for username and handles that are registered in multiple different kinds of communications services. For example, a particular individual may have established all of the following: multiple e-mail addresses; a handle or userid in the TWITTER service; an identity in a social networking system such as FACEBOOK, GOOGLE+, LINKEDIN, etc.; an identity in a shared data communication and display system such as PINTEREST; a 10-digit cellular radiotelephone number for a mobile computing device that is capable of sending and displaying SMS text messages; and other identifiers, names or handles.

In an embodiment, the communications logic is configured to receive a call from an application that provides one or more of the foregoing identifiers and to resolve the one or more identifiers into another one or more identifiers, including but not limited to a user identifier, an internet address, such as a single particular e-mail address, phone number, or other identifier. However, in an embodiment, the resolver does not require resolution into any one particular kind of target identifier; any of the foregoing may be the target of resolution and resolution into a single phone number, for example, is not required. In addition, facilitating communication between two persons does not necessarily require determining a phone number for one or both, because other messaging services such as TWITTER may be used to connect the persons. Thus, embodiments may be configured for disambiguating names or handles from various services and providing DNS-style resolution for Internet identity values.

In an embodiment, the communications logic also implements a policy framework that may be configured with user-specific policies that specify which users are permitted to communicate using the system with which other particular users. For example, if ALICE knows the TWITTER handle of BOB, but does not know BOB's identity in FACEBOOK, and if the policy data is configured appropriately, then the communications logic may permit ALICE to initiate messages via FACEBOOK to BOB after resolving BOB's handle in TWITTER into a corresponding identity in FACEBOOK.

Name resolution in these embodiments enables apps to identify a specific person and initiate communications with that person. In some embodiments, disambiguation of identifiers may be supported by retrieving social graph data for various users and using the social graph data to assist in separating one particular user from another who may have a similar name or other attributes, or determining that a particular handle from another service corresponds to a particular user in the social networking service. In some embodiments, the server computer logic may build and maintain a communication graph that describes who has been in communication with whom using calls into the server computer logic, and may use the communication graph in later operations for disambiguation.

Name resolution in these embodiments may be used for functions other than initiating messages. For example, if an email address can be resolved into the name of an individual user so that the email address is known to be associated with a human, then the email address can be given a different score value, for purposes of fraud detection, than an address that is associated with a machine. Additionally, an email address that receives a high score as likely to be associated with a natural person may be given a higher quality of service designation for purposes of performing various messaging functions; for example, a particular individual with a highly scored address or name may be given treatment as a VIP for purposes of receiving or forwarding messages or performing other functions such as notifications, surfacing messages to applications, etc.

Name resolution in these embodiments also may be obtained using the client device logic on any device that a particular user uses, because the name resolution is performed using the server computer logic and therefore the results are available for use with any device.

In an embodiment, a resolved name database associated with the server computer logic may serve as an authoritative repository for identity information that may be queried by and used by any number of other applications. The resolved name database may obtain authoritative information about particular end users based upon queries to authoritative sources such as the graph data or databases of known reputable sources such as FACEBOOK, LINKEDIN, GOOGLE+, etc. In addition, the resolved name database may store authoritative bindings of a first identity value to a second identity value, and there may be any number of such one-to-one bindings for a particular user. In an embodiment, the resolved name database will not store a list or association of all identity values that are associated with a particular user, for purposes of enforcing reasonable privacy safeguards. Instead, the focus is on the ability to resolve an email address into a corresponding LINKEDIN identity, and/or to resolve the LINKEDIN identity into a FACEBOOK identifier, using separate calls or queries.

In an embodiment, name resolution processes may be supported by importing contact file records from users of the system via applications that invoke calls to the system to perform messaging or communications functions. Examples include contact data records from the CONTACTS app in APPLE IOS devices, the PEOPLE app in ANDROID devices, GMAIL contacts, YAHOO! contacts, MICROSOFT OUTLOOK, etc. For example, using a contact data import function, the server computer logic may provide the service of importing users' contact file entries, which identify persons by name, address, phone, and other identifiers including TWITTER handles or LINKEDIN URLs. While performing the importing service, the server computer logic may silently scan the contact data entries and use the association of a phone number and handle for a particular person to form an entry in the name resolution database that associates the phone number and handle. This process may be iterated over all identifiers that are in a particular contact file record and for all contact file records that are imported. In this manner, the server computer logic may rapidly form a database of trusted bindings of identifiers.

In an embodiment, the resolved name database may be called using a contact data resolution function that is integrated into a contact record management system. For example, a contact record management app may be implemented for mobile computing platforms that stores data records indexed by names of natural persons. Each data record may include a name, address, phone number, email address, and handles or identifiers for various external systems. In such an app, and in other apps such as the CONTACTS app in APPLE IOS devices, the PEOPLE app in ANDROID devices, GMAIL contacts, YAHOO! contacts, MICROSOFT OUTLOOK, etc., a typical occurrence is the creation of multiple data records that contain different identity data for the same natural person, as a result of import, synch, or other transfer operations. For example, a user's app may hold a first data record for CHARLIE SMITH that contains an address and mobile phone number, and a second data record that includes null values for address and mobile phone number but a valid email address value of CSMITH@DOMAIN.COM. In an embodiment, the contact record management app is configured with a RESOLVE function which, when selected, calls the resolved name database for each of the data records and, in response to a successful resolution, consolidates the first data record and second data record and deletes the second data record. For example, calling the resolved name database with the value CSMITH@DOMAIN.COM may result in a response identifying CHARLIE SMITH and a mobile phone number; by matching the mobile phone number to all phone numbers in the data records managed by the contact record management app, the first data record may be located. The value CSMITH@DOMAIN.COM then can be copied into the first data record, and the second data record may be deleted.

The resolved name database also may support a user control interface with which a particular end user may log in and, subject to appropriate authentication and authorization or other verification, reconfigure or control important identity items such as email addresses, phone numbers, handles or other identifiers; thus, embodiments offer the opportunity for individual users to maintain, prune or otherwise tend to their identity information. For example, email addresses or other identity values may be added or marked for removal. In some embodiments, items that are marked for removal may be given less weight in resolution operations, while remaining retained in the database.

In some embodiments, the user control interface may be configured to permit users to review a list of apps that can access the resolved name database, and to specify one or more of the apps as not permitted to access that particular user's identity data in the resolved name database. For example, users could be permitted to configure the server computer logic not to persistently store messages that are communicated through the server computer logic via calls from the app kit logic. These functions are economically possible for a service configured in the manner disclosed herein, as a subscription-based fee model may be used that is not dependent upon retaining messages for purposes of reading the content of the messages and selling advertising opportunities based upon analysis of the content of the messages.

2.2 Address Book Service

In an embodiment, an address book service enables application developers to import and store their users address-books on the infrastructure described herein. In an embodiment, methods defined in the SDK are configured to simplify the import of local address-book data. In an embodiment, the address-book service stores all the available address-book fields for every record in the device address-book In an embodiment, a local address-book deduplication service helps developers clean up address-book records by outputting a confidence score that describes the likelihood of a match for every couple of records in the address-book. In an embodiment, local deduplication is performed using a series of steps. For example, in a perfect matching approach, when two records in an address-book are identical the system flags the two records with a high confidence score that the developer can use to display only one record in the view. Perfect matching on local address-book data is a fast and efficient first pass. Fuzzy matching using various algorithms also may be performed.

In one embodiment, multiple overlapping graphs are used for deduplication (global deduplication) and global identity service input. The concept of overlapping graphs assumes the same entities are present in many address-books with different sets of attached identities. As an example, assume that entity AB1 has record A=a,b,c and the following other entities have the following records:

AB2 has record A=a
AB3 has record A=a,b
AB3 has record B=c

Based upon these records, it is likely that A and B in AB3 are the same entity even if there is no explicit information in AB3. The combined graphs of AB1 and AB2 can be used to determine that there is an entity with identities a,b,c in AB3.

In all embodiments, the data used in address book and identity services is securely stored and is not communicated outside of the logic described herein, and is used only as an input to a global identity service as a basis for a global routing service. In an embodiment, the global identity service maps several identities to a single entity and is directly tied to the global deduplication service. For example, person A (an entity) can have multiple identities 1, 2 and 3 (i.e.: 1@a.com, 2@a.com, 3@a.com), and any unique identifier can be used as an identity (email, phone number, twitter handle, FB profile id . . . )

The global routing service enables routing of messages between entities even when the destination address identity is not explicitly matched with an entity in a specific service. For example, assume:

Person A has identities 1, 2 and 3 (i.e.: 1@a.com, 2@a.com, 3@a.com)

Person A uses identity 3 to sign up for a service (3@a.com), but has signed up/paired all three identities in at least one service on the Layer platform Person B knows only identity 1 for A (i.e.: 1 @a.com), but would still like to communicate with person A on the service.

Person C, D and E have all of A's identities in their address-books, that have been uploaded to Layer And the user/application policy allows routing a message from A to B.

In this situation, when a message is sent from B to 1@a.com the routing service performs a lookup for identity 1@a.com and matches it with entity A. It then checks for the routing policy/permissions and re-routes it to the identity used by A for a specific service (3@a.com). This process makes it possible for B to successfully communicate with A without knowing the specific identity A used to sign up for a service or application. This approach assumes that an identity service has been implemented with connections mapping entities and identities.

3. Message Communication Functions 3.1 Overview

Embodiments may implement functions in the app kit logic and the server computer logic that take advantage of research into improved ways to interact with mobile applications. In other words, the server computer logic and app kit logic may implement improved messaging, voice and video functions and the entity that manages and provides the server computer logic and app kit logic may invest the resources necessary to develop the improvements, so that app developers are not required to make such an investment of resources but may still obtain the benefit of the improvements.

In one embodiment, the messaging functions described herein may be implemented in the context of a mobile computing application that provides message functions, call functions, and contact card functions. Alternatively, the functions may be implemented as separate apps. In one embodiment, a contact card app presents contact data records in the form of a two-level list in which a first level comprises an alphabetized list of persons, and selecting a person causes displaying a contact card superimposed over the list. In some embodiments, calls may be initiated directly from the contact card, and prior message conversations may be viewed directly from the contact card by selecting a conversations function.

In this manner, messages may be sorted and organized by people, and not by time. This approach provides more efficiency for the computer and for users because a particular user who wishes to search for and potentially resume a conversation with a particular person tends to think about the conversation in terms of the counterparty rather than the time at which it occurred. Thus, in conventional approaches, finding a user's last SMS text conversation with JOHN SMITH requires searching the SMS message list of a smartphone app in reverse chronological order rather than by person identifier. In an embodiment, the server computer logic is configured to create and store metadata about messages that are communicated via calls from apps to the app kit logic and to the server computer logic, and the metadata may be returned in response to queries to enable apps to sort or present messages in different ways. For example, an app can be formed to show all conversations associated with a particular person, across SMS, social networking services, and all other services.

In an embodiment, a conversation comprises an identifier associated with a container object; each container object is associated with a particular subject identifier and/or all messages exchanged between two users that occurred within a common time interval, for example, within 15 minutes. As an example, starting a new conversation results in creating a new conversation object having a unique conversation identifier that is associated with it, and the conversation may be separately listed, selected, viewed, and resumed. In sharp contrast, conventional SMS messaging approaches use a continuous chronological list of messages that cannot be identified or separated by subject or time. Each conversation object also may be associated with a person identifier of the persons who are participating in the conversation, to facilitate searching for conversations based on person identifiers, handles, or other values.

In certain embodiments, style sheets may be used to drive the appearance of user interface elements as they are rendered at user computing devices. For example, when URLs or links are added to message content, then the client app kit logic may use a style sheet to determine the appearance of the link or other content on the device on which the app kit logic is executing. In this approach, a link may be converted to a metadata description of the web object referenced in the link, and the style sheets may be used on a device-by-device basis to drive the appearance of the web object. Further, as the message is communicated through the system, the metadata generated for the web object may be carried with the message; consequently, since the metadata identifies the type of content, the location at which it was created, or other values, the metadata can be scanned by other apps and used to control sorting, presentation or other functions by those other apps.

An authentication service is provided. In an embodiment, the authentication service provides methods for federating identity back to integrating application developers, and secure addressing based on the scheme of a name space for integrating developers name. In this context, an application developer creates an account at a server computer that implements the logic described herein. From that account, the developer can have multiple identity providers. The developer provides the server computer with a public key from a public-private key pair, and the server logic validates the key that they generated. The server computer creates a registration record, and the developer receives a key ID and a provider ID. The server computer issues a nonce, which is random and ephemeral; the developer creates a web signature structure, for example using JSON, with a set of claims, in a developer-side computer. One of the claims is: This user is this person. A signature is then created on top of this claim and handed back to the server computer. Thereafter, the server computer can look at any given structure and definitely say if it was generated by the right key.

In most systems, the developer would sign into the app and the app only would send credentials to other servers for authentication. In sharp contrast, the logic herein is configured to validate, using Secure Sockets Layer (SSL) certificates, the device as a device that the server computer knows about, and then separately the server computer logic validates these external identities through the provider mechanism noted above. The server computer logic then combines the two identity results and binds them.

3.2 Implementation Example—Apple IOS

This section describes an implementation example that is compatible with APPLE IOS software. APPENDIX 1, which is attached hereto and is hereby incorporated by reference as if fully set forth herein, describes an implementation example that is compatible with ANDROID software. In an embodiment, the service herein introduces three concepts which facilitate all messaging. The concepts and their function are the following:

Conversations—represented by the LYRConversation object in LayerKit. Conversations coordinate messaging within Layer and can contain up to 25 participants. All Messages sent with LayerKit are sent within the context of conversation.

Messages—represented by the LYRMessage object in LayerKit. Messages can be made up of one or many individual pieces of content. Messages have a file size limit of 64 kb.

Message Parts—represented by the LYRMessagePart object in LayerKit. Message Parts are the atomic object in the Layer universe. They represent the individual pieces of content embedded with a message. MessageParts take an 'NSData' object and a MIME type string. LayerKit does not enforce any restrictions on the type of data you send, nor the MIME types your applications wishes to support.

The code of TABLE 2 demonstrates sending a message with LayerKit. Each line of code will be discussed in detail below.

TABLE 2

```
// Declares a MIME type string
static NSString *const MIMETypeTextPlain = @"text/plain";
// Creates and returns a new conversation object with a single participant represented by
// your backend's user identifier for the participant
LYRConversation *conversation = [LYRConversation
conversationWithParticipants:@[@"USER-IDENTIFIER"]];
// Creates a message part with a text/plain MIMEType
NSData *messageData = [@"Hi, how are you?"
dataUsingEncoding:NSUTF8StringEncoding];
LYRMessagePart *messagePart = [LYRMessagePart
messagePartWithMIMEType:MIMETypeTextPlain data:messageData];
// Creates and returns a new message object with the given conversation and array of
message parts
LYRMessage *message = [LYRMessage messageWithConversation:conversation
parts:@[messagePart]];
// Sends the specified message
[layerClient sendMessage:message error:nil];
```

CONVERSATIONS. The LYRConversation object coordinates all messaging within the Layer service. It represents a stream of messages that are synchronized among all participants of a conversation. All messages sent with LayerKit must be sent within the context of a conversation. LYRConversation objects are created by calling the class method conversationWithParticipants:. The participants array is simply an array of user identifiers. As the Layer Authentication Guide allows you to represent users within the Layer service via your backend's identifier for that user, a participant in a conversation is represented with that same user identifier.

TABLE 3

```
// Creates and returns a new conversation object with a participant identi-
fier
LYRConversation *conversation = [LYRConversation
    conversationWithParticipants:@[@"USER-IDENTIFIER"]];
```

PARTICIPANTS. Once a conversation has been created, participant lists remain mutable and participants can be added or removed. The Layer service does not enforce ownership of conversations so any client can both add and remove participants to a conversation.

TABLE 4

```
// Adds a participant to an existing conversation
// New participants will gain access to all previous
messages in a conversation.
[layerClient addParticipants:@[@"USER-IDENTIFIER"]
toConversation:conversation error:nil];
// Removes a participant from an existing conversation
// Removed participants will only lose access to future content.
They will retain access
// to the conversation and all preceding content.
[layerClient removeParticipants:@[@"USER-IDENTIFIER"]
fromConversation:conversation error:nil];
```

FETCHING CONVERSATIONS. LYRClient exposes a simple API for fetching conversations for an authenticated user. In order to fetch all conversations, call conversationForIdentifiers:, passing nil for identifiers.

TABLE 5

```
// Returns an NSOrderedSet of all conversations for the signed in user
NSSet *conversations =[layerClient conversationsForIdentifiers:nil];
```

Correspondingly, to fetch a specific conversation, that conversation's identifier must be passed.

TABLE 6

```
// Returns an NSOrderedSet of all conversations for the signed in user
NSSet *conversations = [layerClient conversationsForIdentifiers:[NS-
Set
setWithObject:@"CONVERSATION-IDENTIFIER"]];
```

DELETION. LayerKit supports the deletion of both conversations and messages. Deletion of a conversation deletes the conversation object and all associated messages for all current participants. Deletion of a messages only affects that individual message and it's parts.

TABLE 7

```
// Deletes a conversation
[layerClient deleteConversation:
conversation error:nil];
// Deletes a message
[layerClient deleteMessage:
message error:nil];
```

INITIALIZATION. The LYRClient object represents the primary interface for interacting with the Layer service. Your application should only instantiate one instance of LYRClient and should retain the instance at all times. The object is initialized with an application key. We have created an application for you titled, <YOUR-APPNAME>, and the sample code below contains your application's key. You can create additional Layer applications by visiting our developer dashboard. This key is specific to your application and should be kept private at all times. Copy and paste the following into application:DidFinishLaunchingWithOptions: in your AppDelegate.

TABLE 8

```
// Initializes a LYRClient object
NSUUID *appID = [[NSUUID alloc]
initWithUUIDString:@"%%C-INLINE-APPID%%"];
LYRClient *layerClient = [LYRClient clientWithAppID:appID];
// Tells the LayerClient to establish a connection with the Layer service
[layerClient connectWithCompletion: (BOOL success, NSError *error) {
    if (success) {
        NSLog(@"Client is Connected!");
    }
}];
```

On subsequent application launches, LayerKit will attempt to establish a network connection on its own. You can inspect LayerKit's connection state via the public property is Connected on LYRClient.

TABLE 9

```
if (layerClient.isConnected) {
    // LayerKit is connected, no need to call
    connectWithCompletion:
}
```

Be sure to import the LayerKit headers into your AppDelegate.h

TABLE 10

```
#import <LayerKit/LayerKit.h>
```

INSTALLATION. The simplest way to add LayerKit to your application is with CocoaPods (http://www.cocoapods.org). CocoaPods provides a simple, versioned dependency management system that automates configuring libraries and frameworks. You can install Cocoapods via the following command.

TABLE 11

```
$ sudo gem install cocoapods
```

To install LayerKit, first run the following:

TABLE 12

```
$ pod setup
$ pod repo add layer-releases git@github.com:layerhq/releases-cocoapods.git
```

Navigate to your project's root directory and run 'pod init' to create a Podfile Open up the Podfile and add: pod init Save the file and run the following to install LayerKit: pod init Cocoapods will download and install LayerKit and also create a .xcworkspace project. If you do not want to use CocoaPods, you can also clone the LayerKit repository from Github (https://github.com/layerhq/releases-ios) and install the framework directly:

SETUP. If you clone the LayerKit repos or download the source, you will need to drag the framework directly into your project.

1. Open up LayerKit and locate LayerKit.embeddedframework

2. Drag LayerKit.embeddedframework into the Frameworks folder in your XCode project.

3. Make sure "Copy items into destination group's folder" option is checked.

LINK DEPENDENCIES. LayerKit needs a few other frameworks to be included in your project in order to function properly.

1. In XCode, navigate to your Target Settings.

2. Select the "Build Phases" section and expand the "Link Binary With Libraries". Add the following frameworks to your project:—SystemConfiguration.framework;—CFNetwork.framework;—MobileCoreServices.framework;—Security.framework.

3. Navigate to your "Build Settings" tab and add the -ObjC and -lz flag to the "Other Linker Flags" setting.

MESSAGES. The LYRMessage object represents an individual message within a conversation. A message within the Layer service can consist of one or many pieces of content, represented by the LYRMessagePart object.

LYRMessagePart.

Layer does not enforce restrictions on the type of data you send through the service. As such, LYRMessagePart objects are initialized with an NSData object and a MIME type string. The MIME type string simply describes the type of content the LYRMessagePart object contains. TABLE 13 demonstrates creating message parts with both text/plain and image/jpeg MIME types.

TABLE 13

```
// MIME type declarations
static NSString *const MIMETypeTextPlain = @"text/plain";
static NSString *const MIMETypeImageJPEG = @"image/jpeg";
// Creates a message part with a string of text and text/plain MIME type.
NSData *messageData = [@"Hi, how are you?"
dataUsingEncoding:NSUTF8StringEncoding];
LYRMessagePart *messagePart = [LYRMessagePart
messagePartWithMIMEType:MIMETypeTextPlain data:messageData];
// Creates a message part with an image
UIImage *image = [UIImage imageNamed:@"awesomeImage.jpg"];
NSData *imageData = UIImagePNGRepresentation(image);
LYRMessagePart *imagePart = [LYRMessagePart
messagePartWithMIMEType:MIMETypeImageJPG data:imageData];
```

The LYRMessagePart object also declares a convenience method for creating messages with text/plain MIME type as in TABLE 14.

TABLE 14

```
// Creates a message part with a string of text
LYRMessagePart *part = [LYRMessagePart messagePartWithText:
@"Hi, how are you?"];
```

LYRMessage. LYRMessage objects are initialized with an array of LYRMessagePart objects and an LYRConversation object. The object is created by calling messageWithConversation:parts: on LYRMessage. This creates an LYRMessage object that is ready to be sent.

TABLE 15

```
// Creates and returns a new message object with the given
conversation and array of message parts
LYRMessage *message =
[LYRMessage messageWithConversation:conversation
parts:@[messagePart]];
```

SENDING THE MESSAGE. Once an LYRMessage object is initialized, it is ready to be sent. The message is sent by calling sendMessage:error: on LYRClient.

TABLE 16

```
//Sends the specified message
BOOL success = [layerClient sendMessage:message error:nil];
if (success) {
    NSLog(@"Message send succesful");
} else {
    NSLog(@"Message send failed");
}
```

The sendMessage method returns a Boolean value which indicates if the message has passed validation and was queued for delivery in the local data store. If LayerKit has a current network connection, the message will immediately be sent off of the device. Otherwise it will remain queued locally until the SDK re-establishes a network connection. At that point, the SDK will automatically send the message.

LYRMessage objects declare a Boolean property, isSent, which tells your application if the message was successfully sent from your device and synchronized with the Layer service. Your application can observe this property to be notified when a message was successfully sent.

TABLE 17

// Notifies the LYRClientDelegate that a message
or messages were successfully sent
[self addObserver:message forKeyPath:@"isSent"
options:NSKeyValueObservingOptionNew
context:NULL];

Your application will then need to implement observeValueForKeyPath:ofObject:change:context: to respond to send notifications.

TABLE 18

- (void)observeValueForKeyPath:(NSString *)keyPath ofObject:(id)object change:(NSDictionary *)change context:(void *)context
{
  if ([keyPath isEqualToString:@"isSent"]) {
        NSLog(@"Message sent");
  }
}

FETCHING DATA. The LYRClient object exposes a simple API for fetching all messages for a given conversation. This method will return an NSOrderedSet of messages with in descending order.

TABLE 19

// Fetch all messages for a given conversation object
NSOrderedSet *messages =
[layerClient messagesForConversation:conversation];

METADATA. Metadata is a flexible mechanism by which applications can attach contextually relevant information to conversations or messages. Applications do this by associating key-value stores of information to any LYRConversation or LYRMessage object. Layer supports two distinct types of metadata:

Participant Metadata—Information that is synchronized among all participants in a conversation or recipients of a message.

Private Metadata—Information that is private to a given participant, but synchronized among all of their devices.

Metadata may be any mix of nested dictionaries, arrays, strings, booleans, integers, longs, doubles, or NULL.

TABLE 20

// Adds metadata to an object
- (void)setMetadata:(NSDictionary *)metadata forObject:(id)object;
// Updates any existing metadata for an object
- (void)updateMetadata:(NSDictionary *)metadata forObject:(id)object merge:(BOOL)mergeWithExistingValue;

TABLE 21 demonstrates how to attach latitude and longitude info to a new conversation.

TABLE 21

// Adds location metadata to a new conversation object
LYRConversation *conversation = [client
conversationWithParticipants:@[@"USER_IDENTIFIER"]];

TABLE 21-continued

NSDictionary *metadata = @{@"lat" : @"37.7833",
          @"lon" : @"122.4167"};
[layerClient setMetadata:metadata forObject:conversation];

A common use case for Private metadata is a 'Favorites' feature. The following demonstrates how an application could attach metadata to implement a favorites feature.

TABLE 22

// Adds location metadata to a new conversation object
LYRConversation *conversation = [LYRConversation
conversationWithParticipants:@[@"USER-IDENTIFIER"]];
NSDictionary *metadata = @{@"lat" : @"37.7833",
          @"lon" : @"122.4167"};
[layerClient setMetadata:metadata onObject:conversation];

3.3. Transmission Design; Transmission Protocol

In an embodiment, a computer system as described herein implements a data transmission protocol that satisfies the following: Multiple simultaneous requests; Fair frame scheduling; Multiple frame/channel types; Async inbound messages (push notifications); Secure—works over SSL; A unified base frame specifies the frame type/contents.

The protocol supports multiple channels for transmission of data. The data is split into multiple frames, allowing for interleaving of packets and enabling fair packet scheduling. The protocol supports two types of channels; push and RPC. A client can open multiple channels of both types, and receive or transmit data on them simultaneously, depending on the channel type. In one approach, there can be at most 255 channels opened by the client, with IDs ranging from 0 to 254 inclusive. Channel types have numerical values assigned to them. In an embodiment, two types of channels are defined as seen in TABLE 23:

TABLE 23

| CHANNEL TYPES | |
| --- | --- |
| Channel type | Value |
| Push | 0 |
| RPC | 1 |

PUSH CHANNELS. In an embodiment, push channels allow for one-way communication from a server implementing the services herein to the client computing device. They are used to transfer data such as notifications and synchronization requests.

RPC CHANNELS. RPC channels are used for remote procedure calls from the client device to the server and may be one-way or two-way. Any data that needs to be transmitted to the server may be sent over an RPC channel by calling a predefined function. The server may or may not return any data back to the client as a result of the procedure call. Thus, an RPC channel comprises RPC input data communicated from client computing device to server, and optionally RPC output data communicated from the server computer to the client computing device.

FRAMES. Any data sent over the protocol can be split into multiple frames, depending on the size of the payload. There are four types of frames: Init frames; Control frames; Response frames; Keepalive frames; Data frames.

INIT FRAME. In an embodiment, the init frame is the first frame the client must send after establishing a connection. If the frame is not sent in a certain amount of time (dependent on the server) the server drops the connection. The packet has the structure of TABLE 24:

TABLE 24

INIT FRAME PACKET

| Byte offset | Byte size | Field | Description |
| --- | --- | --- | --- |
| 0 | 5 | LAYER | The protocol descriptor string "LAYER", specifying that this is the Layer protocol |
| 5 | 1 | VER_MAJ | The major part of the protocol version to be used; this is the 1 in the 1.3 version, for example |
| 6 | 1 | VER_MIN | The minor part of the protocol version to be used; this is the 3 in the 1.3 version, for example |
| 7 | 4 | FRAME_SIZE | The max frame size to be used in responses sent from the server |

The specified protocol version is used for any subsequent frames. The specified frame size will be used for inbound messages, while messages sent by the client may use any size for a particular request. If an invalid Init packet is sent (the server doesn't support the version, invalid descriptor string, zero frame size) the connection is dropped by the server immediately.

BASE FRAME. All other frame types are subtypes of the base frame. It has the following structure:

TABLE 25

| Byte offset | Byte size | Field | Description |
| --- | --- | --- | --- |
| 0 | 4 | PAYLOAD_SIZE | The size of the data payload for the current frame, +1 byte for the header |
| 4 | 1 | FRAME_HEAD | The frame header, which is described below |

The frame header has the following structure:

TABLE 26

| Bit offset | Bit size | Field | Description |
| --- | --- | --- | --- |
| 0 | 2 | FRAME_TYPE | Specifies the type of frame |
| 3 | 6 | EXTENDED_HEAD | Extended header, dependent on the frame type |

CONTROL FRAME. Control frames are used to send commands to the server. Control frames expect a response frame from the server to indicate if the operation was successful. In one embodiment, three types of control frames are defined: ChAdd; ChDel; Auth. Control frames have a frame type value of 0. The ChAdd frame is used to add a channel. It has the following structure:

TABLE 27

| Bit offset | Bit size | Field | Description |
| --- | --- | --- | --- |
| 0 | 32 | PAYLOAD_SIZE | Always set to 2 bytes; 1 for the header and 1 for the channel ID |
| 32 | 2 | FRAME_TYPE | Always set to 0, specifying a control frame |
| 34 | 4 | OP | Always set to 1, specifying a channel add operation |

TABLE 27-continued

| Bit offset | Bit size | Field | Description |
| --- | --- | --- | --- |
| 38 | 2 | CH_TYPE | Specifying the channel type to add |
| 40 | 8 | CH_ID | The channel ID requested for the added channel |

If an invalid request is made (channel already exists, invalid channel type, etc) the server responds with an error response frame.

The ChDel frame is used to add a channel. It has the following structure:

TABLE 28

| Bit offset | Bit size | Field | Description |
| --- | --- | --- | --- |
| 0 | 32 | PAYLOAD_SIZE | Always set to 1 byte |
| 32 | 2 | FRAME_TYPE | Always set to 0, specifying a control frame |
| 34 | 4 | OP | Always set to 2, specifying a channel delete operation |
| 38 | 2 | PAD | Padding, set to 0 |
| 40 | 8 | CH_ID | The channel ID to of the channel to delete |

If the channel does not exist the server responds with an error response frame. The Auth frame is used to authenticate a user with an authentication token. It has the following structure:

TABLE 29

| Bit offset | Bit size | Field | Description |
| --- | --- | --- | --- |
| 0 | 32 | PAYLOAD_SIZE | Set to 1 + token length |
| 32 | 2 | FRAME_TYPE | Always set to 0, specifying a control frame |
| 34 | 4 | OP | Always set to 0, specifying an authenticate operation |
| 38 | 2 | PAD | Padding, set to 0 |
| 40 | 8 * token length | AUTH_TOKEN | The authentication token |

If an invalid token is sent the server responds with an error response frame. If authentication is successful all open channels are closed and must be added again.

KEEPALIVE FRAME. In an embodiment, clients should send a keepalive frame every N minutes and expect a reply of the same format. If the server does not receive a keepalive frame in a predetermined amount of time, the session is closed. The frame has the following structure:

TABLE 30

| Bit offset | Bit size | Field | Description |
| --- | --- | --- | --- |
| 0 | 32 | PAYLOAD_SIZE | Always set to 1 byte |
| 32 | 3 | FRAME_TYPE | Always set to 3, specifying a keepalive frame |
| 34 | 6 | PAD | Padding, set to 0 |

RESPONSE FRAME. Response frames are used to send control operation statuses to the client. There are two types of response frames: OK, and Error. Response frames have a frame type value of 2.

The OK response frame is used to indicate a successful control operation. It has the following structure:

TABLE 31

| Bit offset | Bit size | Field | Description |
| --- | --- | --- | --- |
| 0 | 32 | PAYLOAD_SIZE | Always set to 1 byte |
| 32 | 2 | FRAME_TYPE | Always set to 2, specifying a response frame |
| 34 | 1 | RESP_TYPE | Always set to 0, specifying an OK response |
| 38 | 5 | PAD | Padding, set to 0 |

The Error response frame is used to indicate an unsuccessful control operation and has the following structure:

TABLE 32

| Bit offset | Bit size | Field | Description |
| --- | --- | --- | --- |
| 0 | 32 | PAYLOAD_SIZE | Always set to 1 byte |
| 32 | 2 | FRAME_TYPE | Always set to 2, specifying a response frame |
| 34 | 1 | RESP_TYPE | Always set to 1, specifying an error response |
| 38 | 5 | ERR_CODE | Error code specifying the type of error |

DATA FRAMES. Data frames are used to transmit payloads to and from the client. Data frames have a frame type value of 1.

| Bit offset | Bit size | Field | Description |
| --- | --- | --- | --- |
| 0 | 32 | PAYLOAD_SIZE | 1 byte + the data frame size from the end of the base frame |
| 32 | 2 | FRAME_TYPE | Always set to 1, specifying a data frame |
| 34 | 6 | P_TYPE | Specifies the packet type |
| 0 | 1 | CH_ID | The channel on which this data frame was sent |
| 1 | 4 | TOTAL_SIZE | Total size of the payload, split across all packet frames |
| 5 | Payload size | PAYLOAD | The frame payload (Length - header - channel id - total size) which will be interpreted as specified by the registered packet type |

The base frame is followed by the rest of the data frame, which has the following structure:

PACKET TYPES. Packet types specify the type of data contained within the payload of each frame. Packet types are local to channel types—each channel type supports different packet types.

| Packet type | Numerical value | Channel type |
| --- | --- | --- |
| Sync request | 2 | Push |
| Normalized message | 0 | RPC |

Sync requests are sent by the server to indicate to a client that synchronization is required. Normalized messages are contain RPC data, and are used by all RPC calls.

Figure 3:
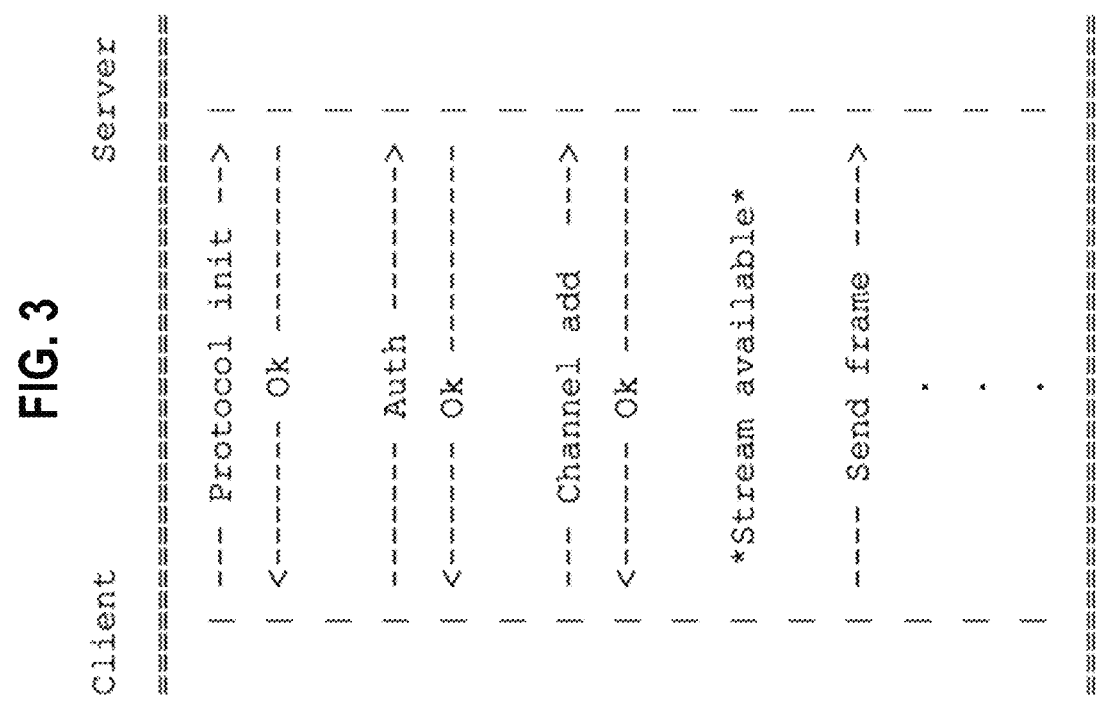

FIG. 3 illustrates a successful authenticated handshake. In the example of FIG. 3, operations denoted "Client" may be implemented by the app 110 (FIG. 1) using SDK 106 to call appropriate functions of API 144, and operations denoted "Server" may be implemented using authentication logic 142. The client computing device 102 initiates authentication with a protocol initiation operation; the server replies with an OK indication. The client computing device 102 then sends an authorization start message; the server replies with an OK indication. The client computing device 102 then sends a channel add indication; the server replies with an OK indication. The client computing device 102 then has a stream available on which to send events. The client computing device 102 can send a frame of any of the types described above.

3.4. Synchronization Design

In an embodiment, the services herein include logic that is configured to synchronize message states among multiple different end user computing devices that are associated with or logged in with the same account. In an embodiment, the synchronization logic also implements real-time message synchronization, so that changes are seen immediately if devices are online. In an embodiment, the synchronization logic also implements offline synchronization so that changes are propagated when the device comes online. Example actions involved in synchronization include create message, delete message, change read receipt (delivered, seen), add/remove tag.

The Layer platform implements communications in a client/server model wherein messages are exchanged between clients using the Layer server computer 130 as an intermediary. On the Layer server computer 130, threads of communications are modeled as Streams of Events. Each Stream has a set of members that represent the unique people who are communicating. The Stream can be implemented, in one embodiment, as an append-only log, in which each Event represents an activity within the thread of communication between the members. Many of these events are Messages sent by one of the members, but Events also model changes to the Stream itself such as the addition and removal of members, the deletion of previously sent Messages, or other activity such as a typing indicator or presence notification. As each Event is written to the Stream, it is assigned a monotonically increasing sequence number. These sequence numbers are used by the Layer client in order to synchronize local state with the server. A Message, in this context, may be the delivery of text, images, or video content.

For use by an app 110, the Layer APIs present communications in a different form from Streams and Events as used at the server computer 130. In one embodiment, the app 110 interacts with the API using Conversations containing Messages, which may have an arbitrary number of Message Parts. Conversations are threads of communication occurring between two or more Participants. Each Message sent to a Conversation has a particular status value associated with each Participant. The status values are determined based upon Delivery Receipts and Read Receipts and enable clients to determine whether a particular message has been successfully sent, delivered, or read by another participant. Conversations and Messages may be created and sent while the client does not have Internet access and thus cannot communicate with the Layer platform. Such offline content is queued locally on the clients and delivered once connectivity can be re-established.

The use of two different communication models for the Layer client and server enables the system disclosed herein to effectively serve both developers of app 110 and infrastructure engineers who maintain server computer 130. For example, developers of app 110 may prefer a rich, intuitive programming model in which to implement communications, whereas infrastructure engineers working on the server computer 130 may prefer a simple system that is straightforward to deploy and easy to scale.

For the two models to co-exist while interoperating with a single data set, they may be harmonized when the clients and server interact; harmonization of the models may be implemented in a two phase process termed Synchronization and Reconciliation. In one embodiment, app 110 is configured to transfer data between the two models using a two phase process termed Synchronization and Reconciliation.

Synchronization is now described. For a Layer client such as app 110 to harmonize its local Conversations and Messages model with the Streams and Events model of the server computer 130, the app is configured to synchronize its local database with the canonical representation on the server. In one embodiment, app 110 is configured to refresh its list of Streams from the server. Refreshing the list of Streams enables the app 110 to discover any newly created Streams that the app has not yet represented in storage. Refreshing also permits the app 110 to discover any updates to existing Streams that the app needs to consume. In response to receiving a request to refresh the list of Streams from app 110, server computer 130 returns the latest sequence number, which the app may compare to the highest sequence number that the app previously received to determine whether new content is available. Once the client app 110 has discovered the latest sequence number for all Streams, the app can compute the list of Events that the app needs to request from the server computer 130, and submit requests for those Events. The server computer 130 replies by providing the Events, and the app 110 updates local persistent storage with Streams and Events. Once a client has persisted all of the Streams and Events that it belongs to it is said to be synchronized with the server.

However, in an embodiment, synchronization alone as just described is not sufficient to harmonize a client with the server and enable communications. In an embodiment, the client app 110 uses a Reconciliation process to transform Events and Streams into a set of database tables at the app representing Conversations, Messages, and Message Parts. To implement Reconciliation, each Layer client maintains two local database tables configured as queues that represent differences between the Streams and Events, on the one hand, and Conversations and Messages on the other. In one embodiment, the local database tables include a Syncable Changes table and Unprocessed Events table. In an embodiment, each row in the Syncable Changes table represents a difference that was created on the local database and needs to be transmitted to the Layer server computer 130 as a new Event. In an embodiment, each row in the Unprocessed Events table represents an Event that was retrieved from the Layer server computer 130 and needs to be updated as changes in the Conversations and Messages data of the app 110.

In an embodiment, Reconciliation is performed in two phases: Outbound and Inbound. Outbound Reconciliation involves the creation and publication of Events for local changes that are queued as Syncable Changes. Inbound Reconciliation involves the processing of Unprocessed Events into changes on the local data model. Once these two queues have been fully processed the client app 110 is said to be in a Synchronized and Reconciled state.

In one embodiment, the model of Conversations and Messages implemented for an app 110 is presented via an object oriented interface that abstracts away the underlying storage and transport concerns. Because these objects are local representations of distributed network state, the app 110 should have the capability to detect changes to the object model that are made by remote instances of the same app, so that the local user interface can be updated to reflect the best current understanding of Conversation state. Producing such live changes to objects held in memory may benefit from the implementation of object identity values that are unique across peer app instances, and a means to apply changes to objects. In an embodiment, the Layer SDK's identify local objects using server-defined identity values, and use a caching layer to ensure unique identity. Once unique object identity is established, change notifications can be emitted by the object that is undergoing a change during the Reconciliation process.

To ensure that objects are globally unique across all instances of a Client app 110 that may be running on different mobile computing devices, a unique object identifier value is created for each object that is instantiated or retrieved from the local database. For newly instantiated objects, a temporary object identifier is assigned, and later the Layer server computer 130 assigns a permanent identifier. When an object is retrieved from the database, the object identifier is loaded with all other attribute data.

Using the globally-unique object identifiers, the system can enforce thread and process level uniqueness. In an embodiment, when changed data for an object is to be stored persistently, the Layer client such as app 110 provides the object identifier to a cache, which attempts to identify an existing object instance for a given object identifier and returns the existing instance or else instantiates a new instance if no existing instance could be found.

The use of object identifiers that are globally unique across all instances of an app enable the system to globally track and notify interested objects of mutations made to the local object graph. To accomplish this, Layer objects maintain a set of object changes that model mutation to the properties of a given object by tracking the name of the property that was changed, its value prior to mutation, and its value after the mutation was made. These values are queued in association with the object until the object is persisted back to the database. At persistence time, all object changes are committed and emitted via a notification back to the public API consumer using a publish-subscribe mechanism.

In one implementation, synchronization is based on users exchanging changelogs with the server. When committing a change the user sends a changelog with his last sync anchor point to the user and gets a new set of changes back. Both user and the server need to apply the received changes. The server will, if needed, inform all of the users which need to be notified about changes waiting on the server. The exchange is performed using Thrift RPC services and structures. Each user can have multiple clients or devices. One user has only one message store and changelog. These are independent between users but are shared between users clients.

In an embodiment, the system defines 3 types of operations. Operation is defined as one change in the changelog. A New message operation sends a message and is a global operation. An Update status operation changes the read receipt status and is a global operation. An Update tags operation creates a new list of tags. Deleting a message can be implemented as a tag. This is a local operation. Some operations only work on a user's message store, while others get applied to recipients messages as well. All parties which get affected by the changes get notified via the SyncUpdate asynchronous notification. The notification is defined on the transport protocol layer.

In an embodiment, the following data structures may be used:

```
enum SyncOperationType {
  NEW_MESSAGE,
  UPDATE_STATUS,
  UPDATE_TAGS
}
struct NewMessageOp {
  1:optional Message message
}
struct UpdateTagsOp {
  1:required list<string> tags
}
struct UpdateStatusOp {
  1:required i32 status
}
struct UpdateRecepientStateOp {
  1:required i32 state
  2:required MessagingAddress recepient
}
struct SyncOperation {
  1:required SyncOperationType type,
  2:optional i32 seq = 0,
  3:required string messageId,
  4:optional NewMessageOp newMessageOp,
  5:optional UpdateTagsOp updateTagsOp,
  6:optional UpdateStatusOp updateStatusOp,
}
```

The initial anchor point used by the client is 0. In this case all messages will be received by the initiating device. The server will return only the latest version of the message without subsequent changes (or operations) which might have been performed later. After each synchronization request the user receives an anchor point which he must send to the server on the next synchronization request.

When the server receives changes it first removes duplicates. If a certain operation is performed on the same message only the last one is used. All previous changes are discarded. All operations should be in the order in which they are applied. Merging of the changes is performed by the server on any synchronization requests it gets from the client. When the changelog is received it fetches all of its stored changes since the last anchor point and joins the lists. All new operations are written and applied, and new (to the client) are sent as a reply to the client.

Conflict resolution is different depending on operation type. "Last Write Wins" strategy is used in general. In an insert message operation, if the id is the same, then the last message is used. In an update tags operation, all conflicting tags are merged. There are no deletions in this case. In an update status operation, the one with a higher status is chosen. You can never apply decreasing statuses. Thus, Sent<Delivered<Read where Read is the final status.

The client commits its changes by calling the synchronize method on the server. The client can do so whenever the client has pending changes, or when the client receives a SyncUpdate notification from the server. In the later case the committed changes can be empty and only new changes will be received. When the sent changelog is not empty the server performs merging, conflict resolution as described above and notifies all participating parties of available changes.

When committing an operation the sequence number or operation identifier should not be set.

Figure 5:
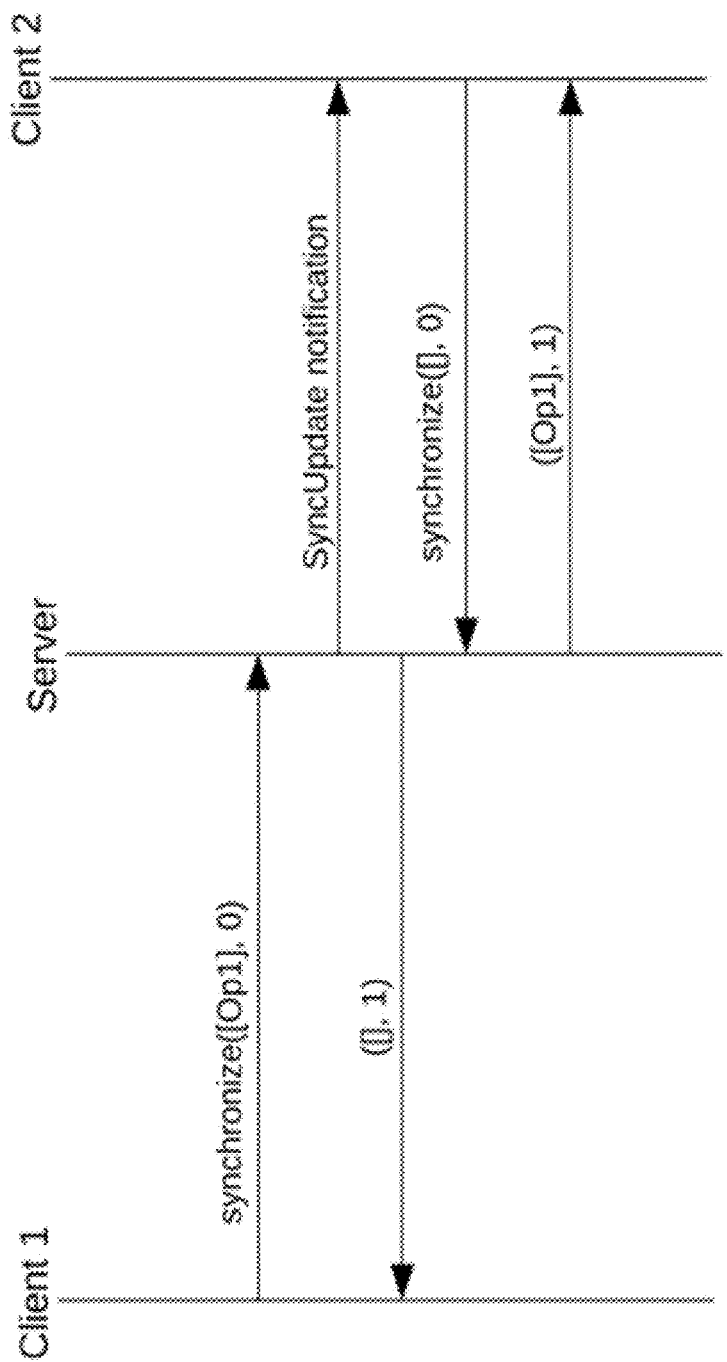
FIG. 5 illustrates a first example of method invocations and messages that may be used in synchronization.

FIG. 5 illustrates a first example of method invocations and messages that may be used in synchronization. In this example Client 1 synchronizes one operation with the server as indicated by the operation synchronize([Op1],0), which may represent using the client-side SDK to call a function of API 144 that is handled by the synchronization logic 140. The server has no conflicting changes, and therefore the server notifies the other Client of the changes using a SyncUpdate notification; the server also replies to Client 1 with an increased anchor number. Client 2 has no changes of its own, initiates the sync using the operation synchronize([ ],0) indicating null operation, and receives the new operation [Op1] which was synced by Client 1.

Figure 6:
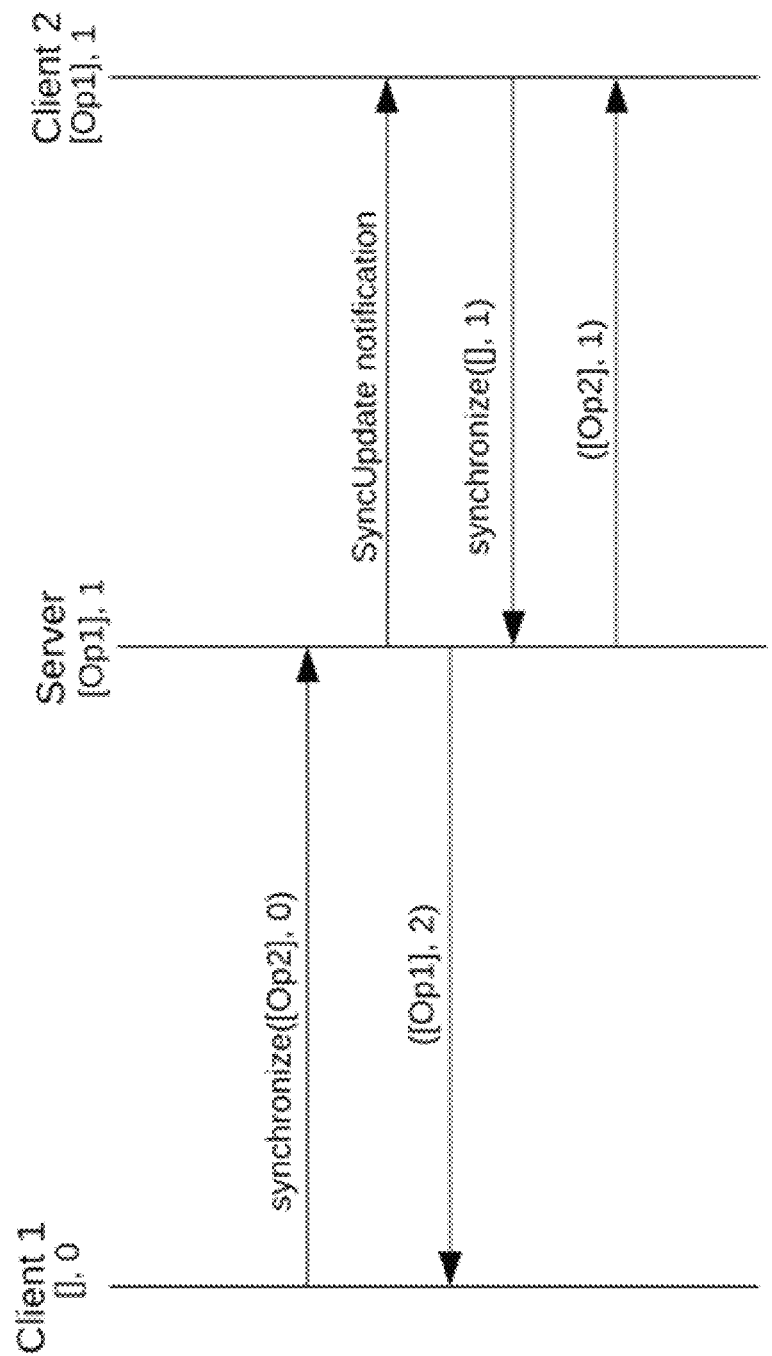
FIG. 6 illustrates a second example of method invocations and messages that may be used in synchronization.

FIG. 6 illustrates a second example of method invocations and messages that may be used in synchronization. Client 2 and Server have synchronized states, as indicated by [Op1] and anchor "1" below the labels Server, Client 2. This example shows how a new client, Client 1, joins and tries to synchronize. Client 1 sends the message synchronize([Op2], 0) specifying a request to synchronize operation Op2. The server sends an update notification to Client 2, and also provides Op1 and an incremented anchor to Client 1. Client 2 has no operation to synchronize so it replies with a null message and its anchor. The server then provides Op2 and its anchor to Client 2.

The synchronization approach herein has numerous technical benefits over the general idea of synchronization. From the perspective of a client computer or client application developer, the synchronization approach appears to involve conversations, metadata, and groups of people, with features such as read, typing, etc. However, the server side code may implement all such items as events. Thus, an embodiment may implement the concept of messages on top of a stream of events. Further, the server algorithm is scalable and reliable because it is configured only to assert with truth that an event happened and to give the event a sequence number; everything else is client-defined.

Figure 14:
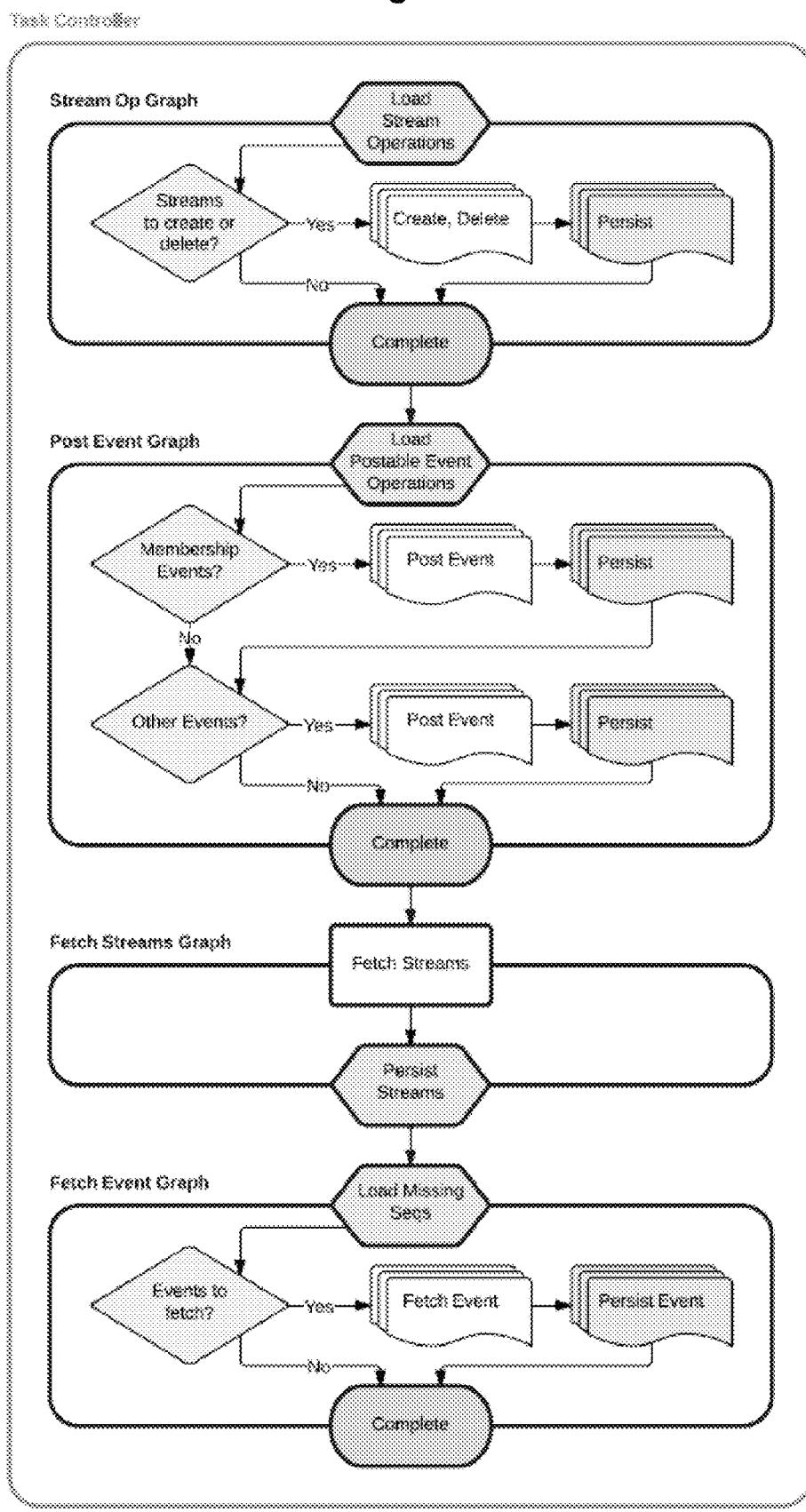
FIG. 14 illustrates an example synchronization operation flow.
Figure 15A:
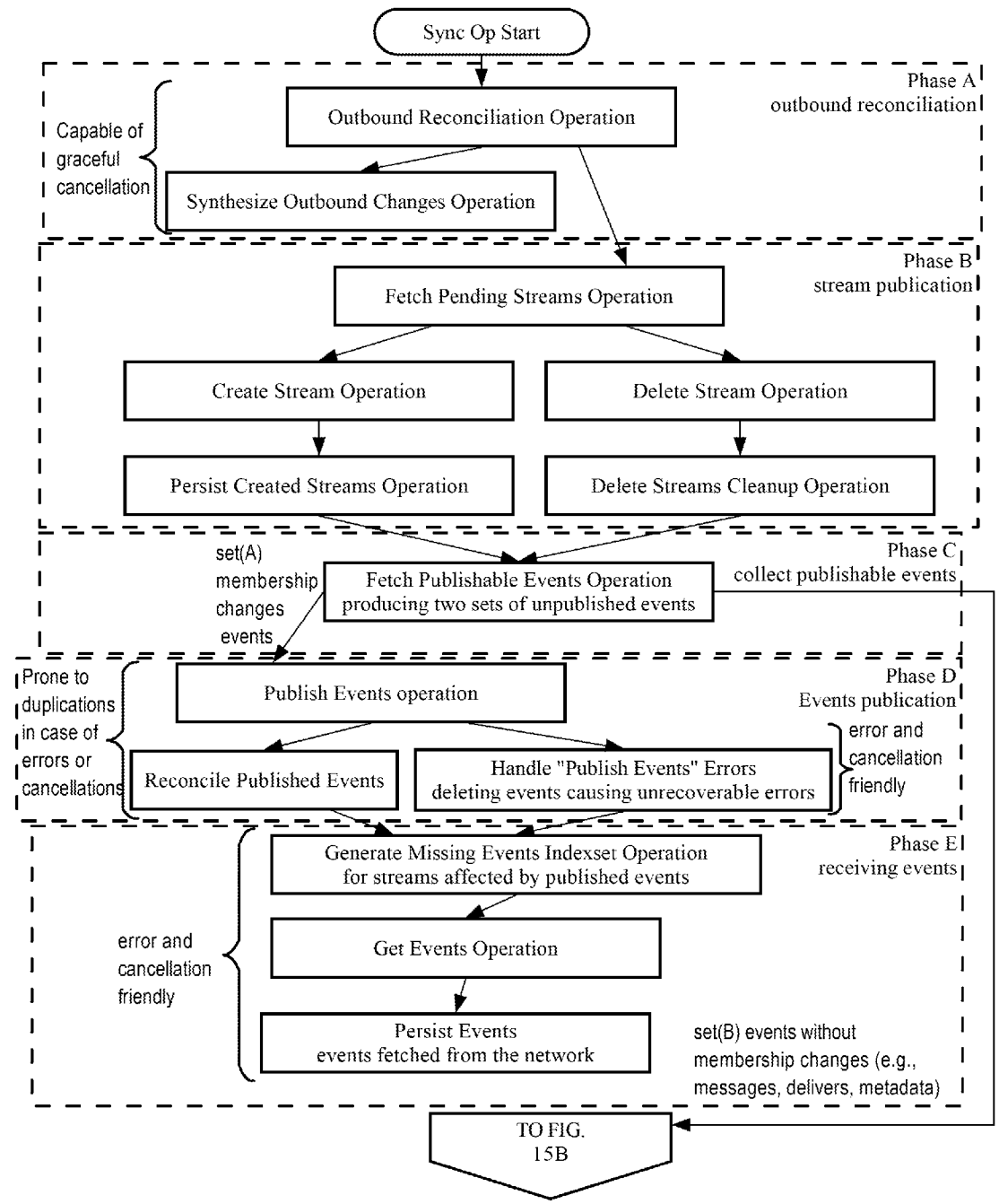
Figure 15C:
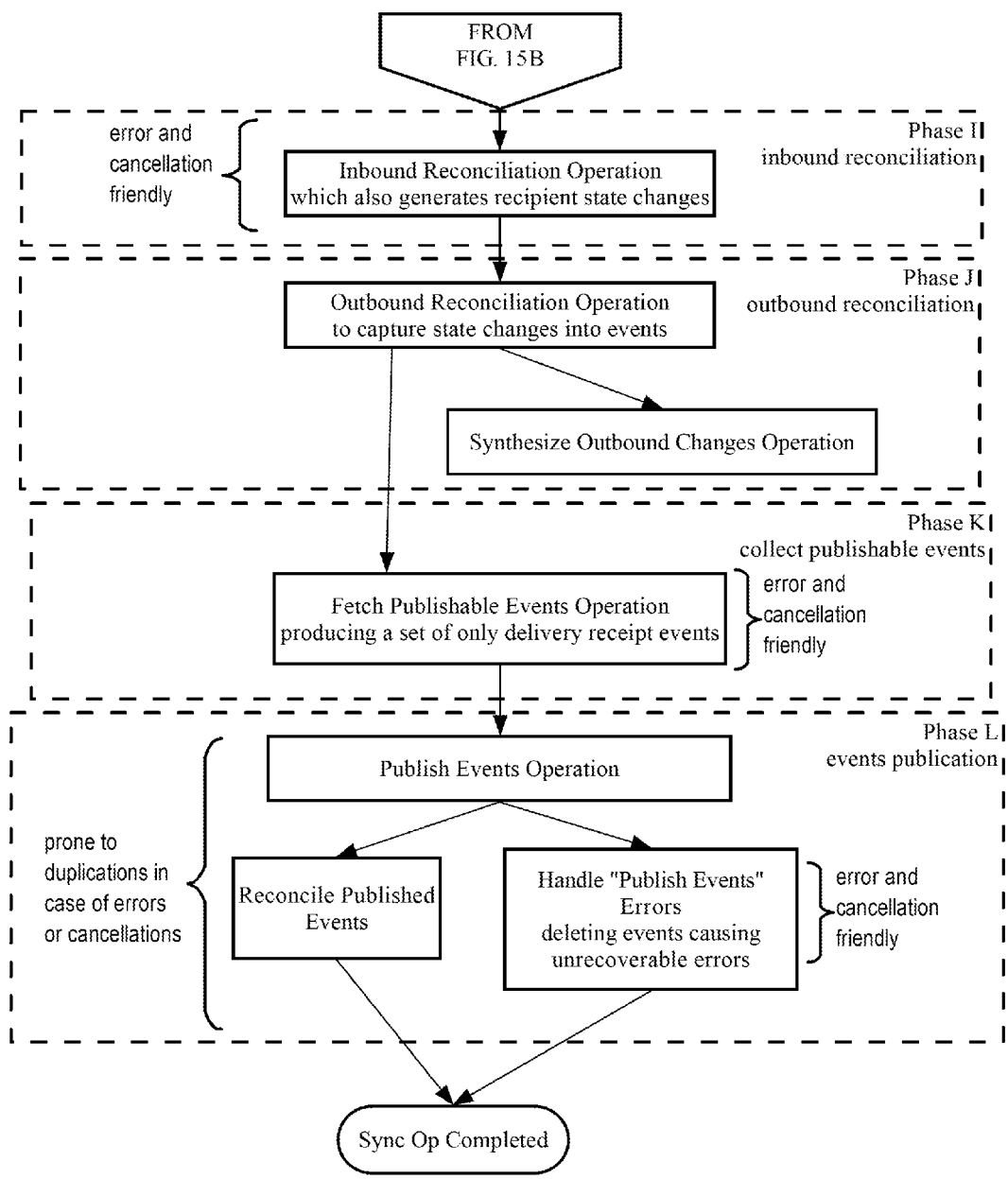
Figure 16:
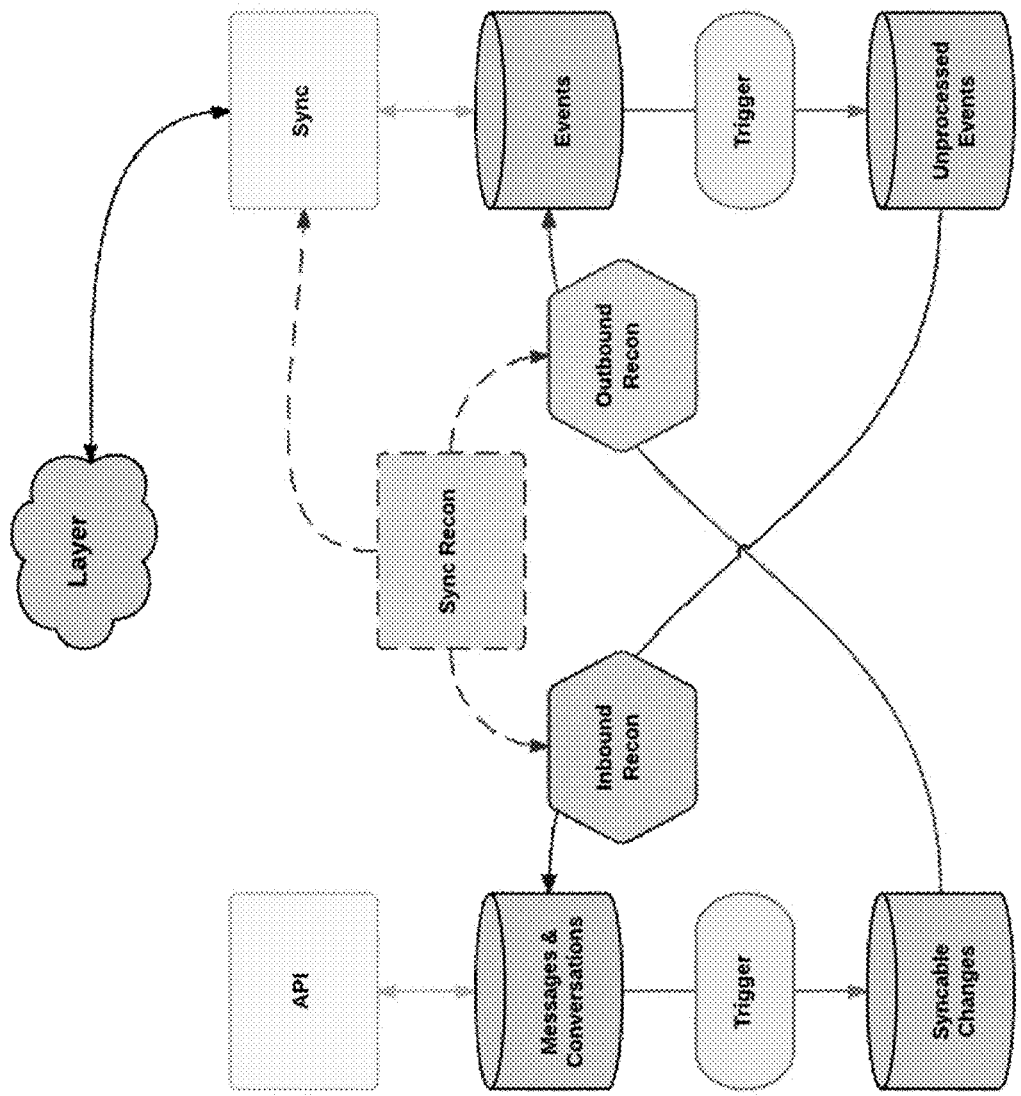
FIG. 16 illustrates example client-server messages and data flows in synchronization.

FIG. 14 illustrates an example synchronization operation flow. FIG. 15A, FIG. 15B, FIG. 15C is a three-view flow diagram illustrating dependencies in synchronization operations. FIG. 16 illustrates example client-server messages and data flows in synchronization.

In one embodiment, client-server event generation for the purpose of synchronizing multiple client computing devices uses the SQLite database as a foundation, with triggers to maintain an ongoing catalog of changes. As Conversations, Messages and associated metadata models change within the data store, a series of triggers are configured to track interesting changes into a synchronization table, which may be denoted in one example as the syncable_changes table. In an embodiment, the synchronization table has the following schema:

```
-- Valid change types enum: INSERT=0, UPDATE=1, DELETE=2 CREATE TABLE
syncable_changes(  change_identifier INTEGER NOT NULL PRIMARY KEY AUTOINCREMENT,
table_name TEXT NOT NULL,  row_identifier INTEGER NOT NULL,  change_type
INTEGER NOT NULL,  column_name TEXT );
```

The synchronization table maintains a log of all client side data model changes that are capable of synchronization, and that have occurred since the completion of the previous synchronization operation. When the synchronization process is ready to create Event objects for local changes, the synchronization process performs the following steps: Open a transaction. Select all rows from the changes table. Iterate across all rows, creating an Event object for each syncable change (as appropriate—not all changes may have corresponding event representations) and deleting the record from the syncable_changes table as it is processed. Publish all pending Events to the server. Reconcile the local Events database with the server (request missing Event sequences). Replay all fetched Events on top of the Messages database, reconciling local state with the events. Commit the transaction.

In an embodiment, the triggers are configured to avoid the creation of additional rows in the synchronization table as the process proceeds. This avoids the need to do bookkeeping to determine which rows represent genuine changes as opposed to administrative creations. Once a transaction has been opened for a synchronization operation, the count of syncable rows will only decrease, regardless of externally occurring inserts.

In an embodiment, the synchronization logic is configured to maintain a list of server-originating events that have not yet been applied to the message data model. In an embodiment, maintaining the list is accomplished using a trigger on the Events table:
CREATE TRIGGER queue_events_for_processing AFTER INSERT ON events WHEN NEW.server_sequence IS NOT NULL BEGIN INSERT INTO unprocessed_events (event_database_identifier, created_at) VALUES(NEW.database_identifier, datetime('now')); END;

This trigger differentiates between client and server originating events by relying on the fact that local, unpublished events will have a NULL sequence number. Once each queued event has been processed, its row is deleted from the unprocessed_events table. Any events that cannot be processed for whatever reason can remain in the queue for subsequent processing runs.

4. Authentication Logic and Protocol

In an embodiment, an authentication service implements a Layer Authentication Protocol that provides a way for the system herein to authenticate devices and users and secure communications with them, using a federated identity from a third-party provider. At a high level, the Layer Authentication Protocol creates a Transport Layer Security (TLS) connection with a Client, which is used to protect all communication with Layer, but without any notion of identity. Within this TLS connection, there are one or more authentication sessions, bound to a specific user identity, which can be used to perform application actions. Separating these two concepts makes it possible to cache sessions and avoid expensive authentication requests to external servers. Authentication is performed by the Client making a call to a third party identity Provider. The Provider generates a cryptographic token, which verifies the identity of the user of the Client. This token is returned to the Client, and then sent to Layer, which uses it to make an association to an internal Layer user.

Figure 7:
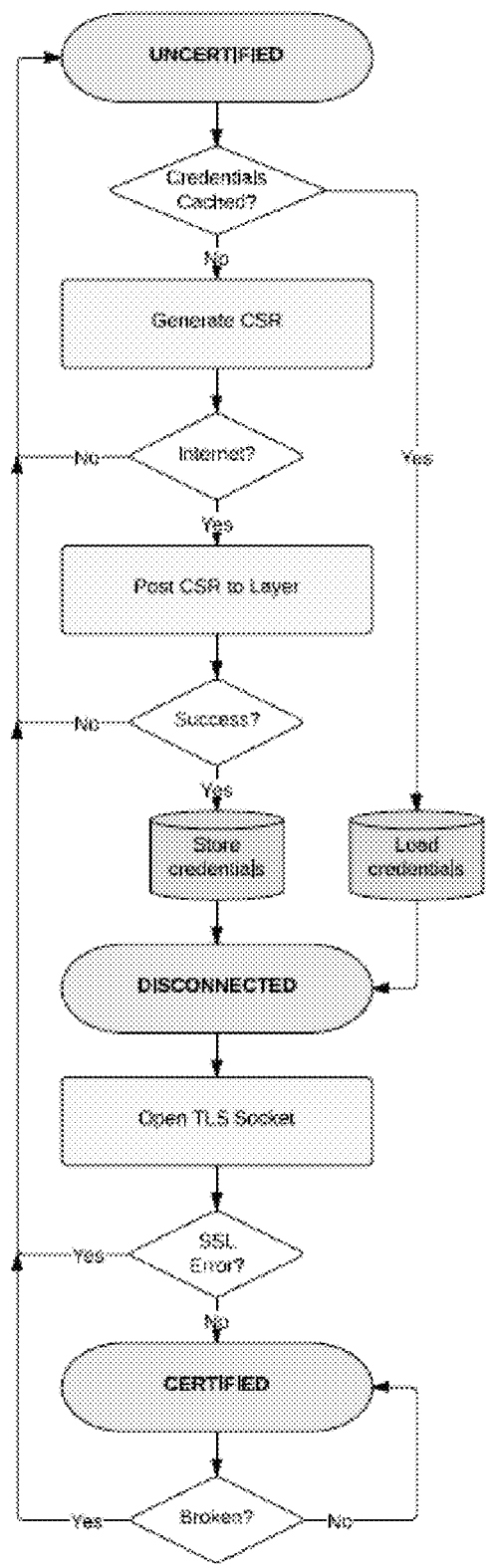
FIG. 7 illustrates an overview of a computer-implemented client computer certification process.
Figure 8:
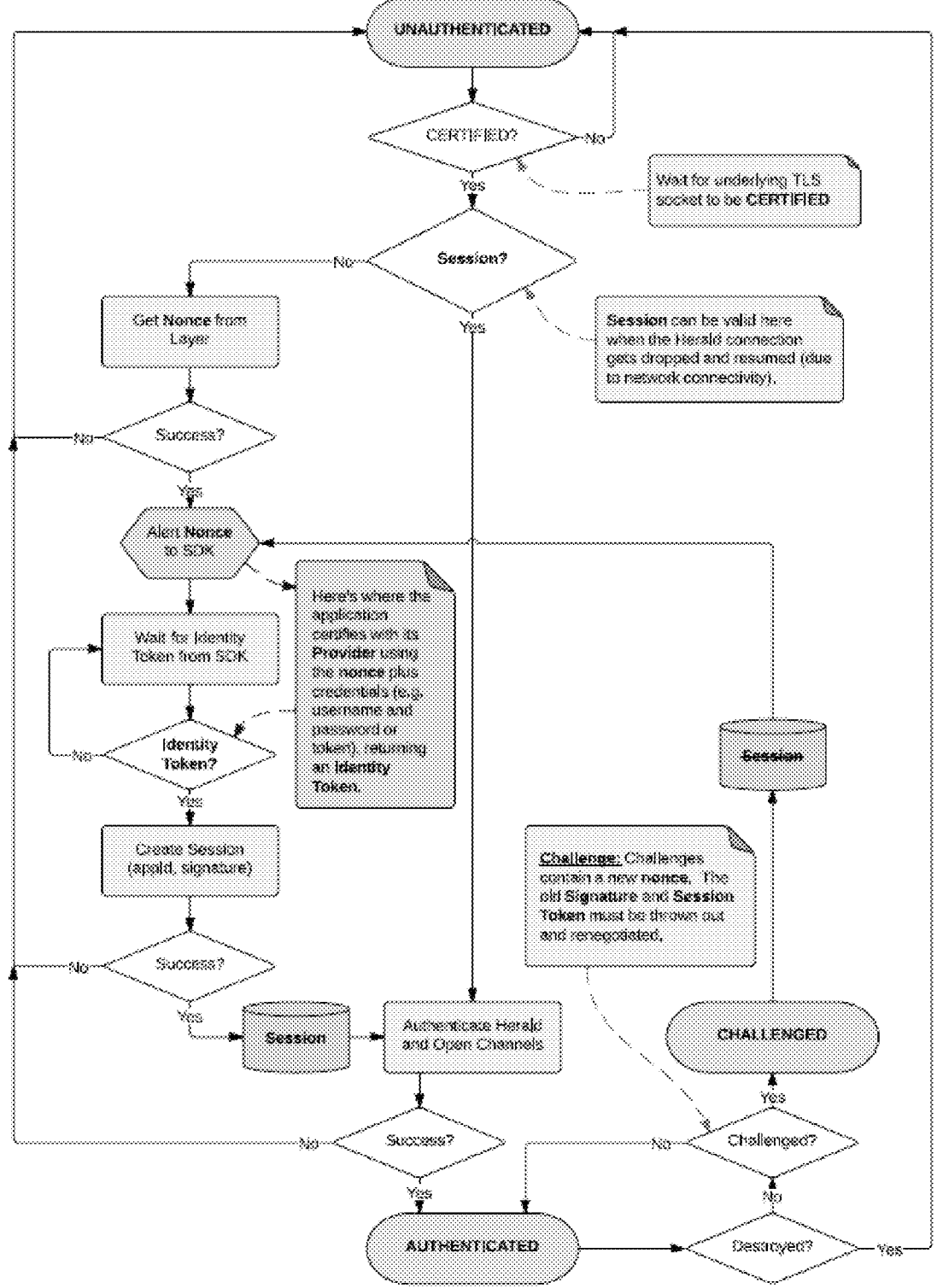
FIG. 8 illustrates an overview of a computer-implemented client computer authentication process.

FIG. 7 illustrates an overview of a computer-implemented client computer certification process. FIG. 8 illustrates an overview of a computer-implemented client computer authentication process. In the description herein, the term Layer refers to an internal service that is configured to terminate client connections; Client refers to the SDK and application running on a computing device; Provider refers to an external service that owns the user identity such as a customer back end server. Referring first to FIG. 7, in one embodiment, for a Client in the Uncertified state, the authentication logic 142 tests whether Client credentials are cached. If so, then the credentials are loaded from the cache and the Client is transitioned to the Disconnected state. If there are no cached credentials for the client, then the authentication logic 142 generates a certificate signing request (CSR). The CSR may be processed either using an internet-based authentication server or a server within the Layer infrastructure, in which case the CSR is posted to Layer. If the request is successful, then newly created Client credentials are persistently stored and the Client is transitioned to the Disconnected state.

In the Disconnected state, a TLS socket connection is opened to the Client. If no error occurs during the SSL handshake phase for establishing the connection, then the Client is transitioned to the Certified state which is maintained until the Client or Layer Server breaks the connection.

Referring now to FIG. 8, in one embodiment, a Client begins at the Unauthenticated state and may send a request for a communications service to the Layer server, such as a request to place a phone call, perform a synchronization, or invoke other services. In response, the authentication logic 142 tests whether the Client is Certified and if not, then enters a wait state until the underlying TLS connection is Certified as seen in FIG. 7. If a Certified secure socket connection exists then the authentication logic 142 tests whether a valid Session is present.

If no valid Session exists, then the Client app requests a nonce from the authentication logic 142. Then the authentication logic 142 tests whether delivery of the nonce was successful; a failure state here is shown in case the authentication logic 142 generates an error for some reason, and in that case the Client remains in the Unauthenticated state and may re-try. Generating a good nonce results in alerting the nonce to the SDK at the Client. At that point, the Client app 110 certifies with its server-side Provider 160 using the nonce and appropriate credentials such as username and password, or token, and the Provider returns an Identity Token to indicate that the Provider authenticated the Client. A wait state and test are provided in the process of FIG. 8 to await return of the Identity Token that the Client obtained from the app's Provider. The authentication logic 142 next creates a Session that includes an application ID and signature, and a session token. The session details may be persistently stored in the repository 150.

The authentication logic 142 then authenticates a herald connection and opens channels. Success in these operations results in transitioning the Client to the Authenticated state. If the connection is destroyed, as by revocation of the certificate, then the process is repeated; a challenge also may occur at any state. Challenges contain a new nonce. The old signature token and session token are discarded and renegotiated.

Figure 9:
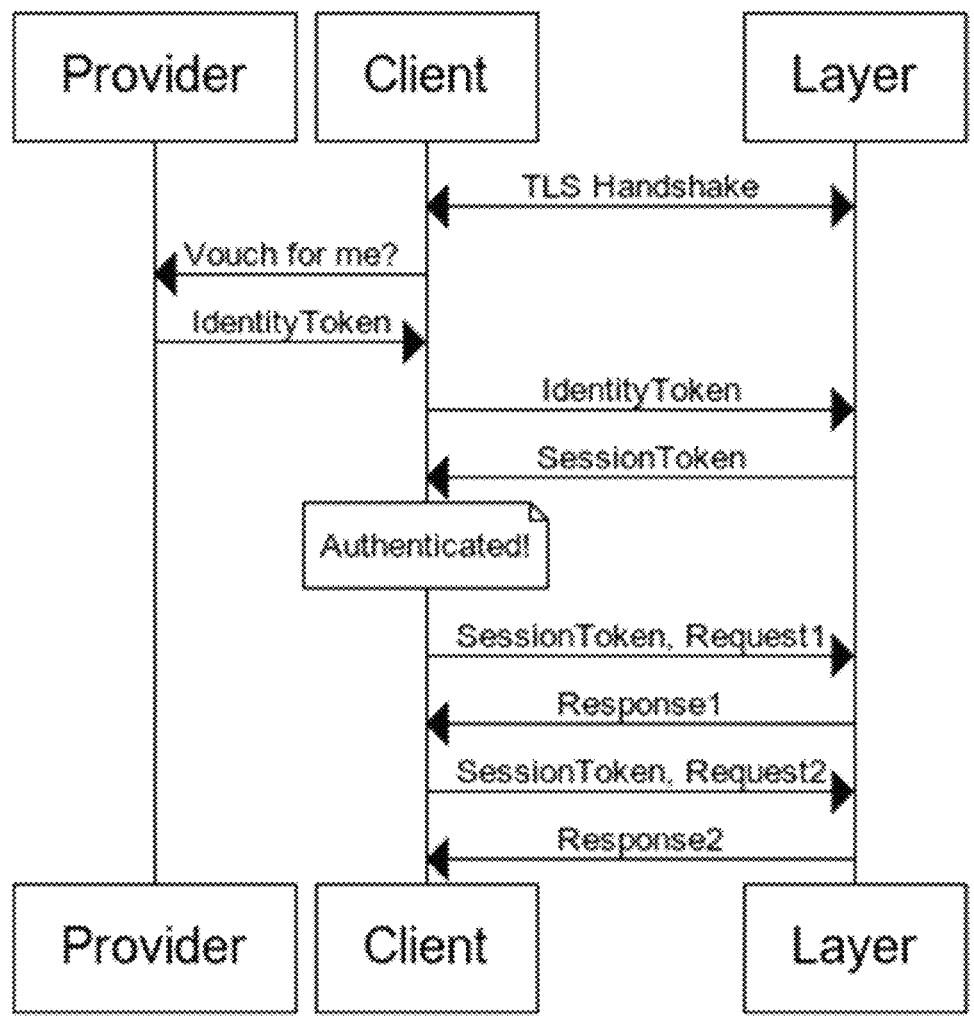
FIG. 9 illustrates a simplified request flow, showing how sessions are established and requests are handled, in an embodiment.

FIG. 9 illustrates a simplified request flow, showing how sessions are established and requests are handled according to the foregoing process, in an embodiment. The Client and Layer first engage in a TLS handshake to establish a secure TLS connection between them. The Client then queries its Provider to vouch for the Client by providing an Identity Token; if the Client can successfully authenticate to the Provider using the Provider's back-end authentication mechanisms, then the Client receives the IdentityToken from the Provider and forwards it to authentication logic 142 of Layer, receiving a SessionToken back from the authentication logic. The Client is now authenticated to the server computer 130 and can send requests that include the SessionToken, and receive appropriate responses.

In an embodiment, Layer authentication maintains two state machines: Connection State and Authentication State.

Figure 10:
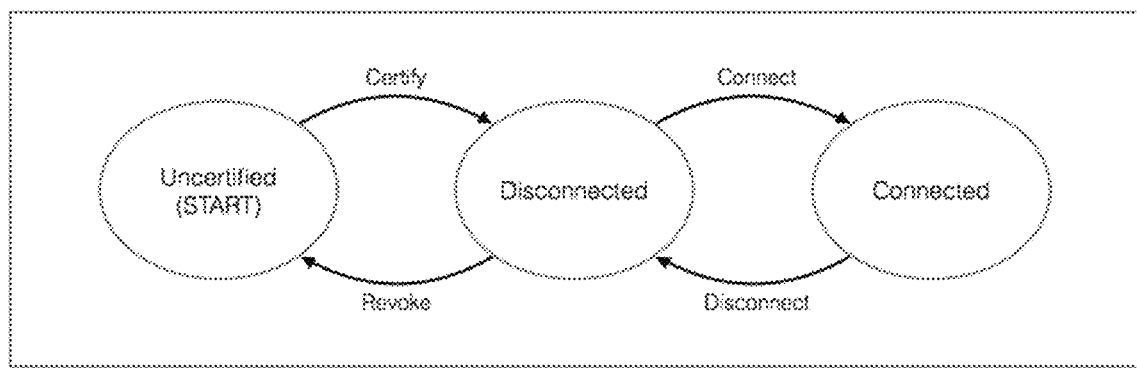
FIG. 10 illustrates an example Connection State Diagram.

These state machines are separate but related, with Authentication State nested within Connection State. Connection State models the physical connection of a Client with Layer. This connection is intended to secure the low level connection, to prevent eavesdropping and provide a consistent context for identity session management and resumption. Connection State doesn't address user identity or authentication; these are modeled by Authentication State. FIG. 10 illustrates an example Connection State Diagram.

In the Uncertified state, allowed actions are Certify. In this state, the Client has never communicated with Layer, or has had its certification revoked. This represents a new Client with no TLS client certificate, or an existing Client with an invalid TLS client certificate. In the Disconnected state, allowed actions are Connect. The Client is not connected with Layer, but has been certified by Layer. This represents a new Client with a valid TLS client certificate, but no TLS connection with Layer.

The intent of the certification process is to have a consistent context within which to perform authentication. Ideally, certification should happen only once, and certificates will have a long lifetime, in the range of years. However, Layer may revoke this certification at any time, and clients must be prepared to return to Uncertified and restart the process at any time. A secondary goal is to provide a hook for device validation, for anti-abuse purposes. In one embodiment, the system can obtain a CAPTCHA value as part of the certification. After performing the Certify operation, the socket that was used is terminated. Subsequent requests are received on a new socket, to create a new TLS session using the newly issued certificate.

In the Connected state, allowed actions are Disconnect. In this state, the Client is connected to Layer. This represents a Client with live TLS connection with Layer. The connection is initiated by Client, and is established using a standard TLS handshake with client certificate authentication. Client must validate Layer's certificate against its trust chain, and also pin the certificate to the embedded Layer fingerprint. Layer must validate Client's certificate against its internal CA. The Connected state doesn't imply anything about identity or authentication. This is modeled separately by the nested Authentication State. The Connected state only provides eavesdropping protection for the communication between Client and Layer.

Figure 11:
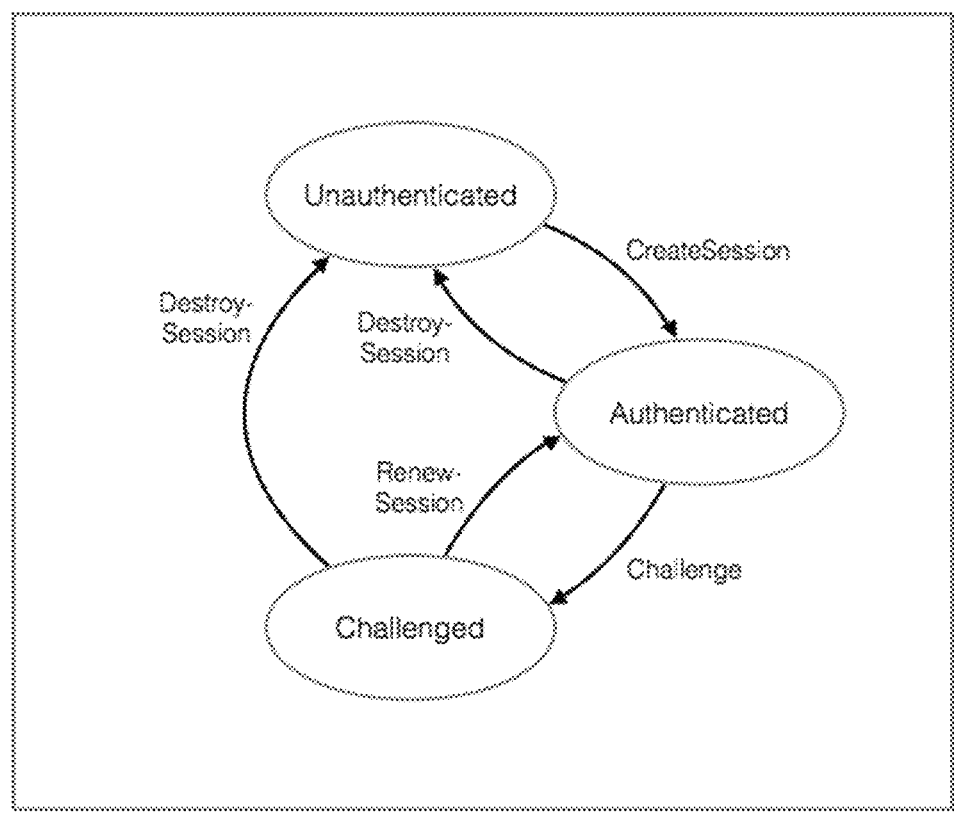
FIG. 11 illustrates an example Authentication State Diagram.

In an embodiment, the Authentication State models the authentication and user identity of a Client. This allows a Client to establish an identity session which can be used when communicating with Layer. The identity of a Client is used to attribute the source of events and the ownership of content within Layer applications. The identity of a Client is provided by an external Provider, but managed by Layer. FIG. 11 illustrates an example Authentication State Diagram.

In the Unauthenticated state, allowed actions are CreateSession. In this state, the Client is not authenticated. This represents a Client with no identity session, for instance because the Client has never authenticated, or was authenticated but subsequently logged out. A Client in this state can't perform any application actions, but it can create a new identity session.

In the Authenticated state, allowed actions are DestroySession, Challenge. In this state, the Client is authenticated to Layer. This represents a Client with a valid identity session. A Client in this state can perform all application actions, which will be associated with the identity.

In the Challenged state, allowed actions are RenewSession, DestroySession. In this state, the Client was authenticated to Layer, but has been challenged. This represents a Client with a previous identity session that's no longer valid, for instance because of timeout or other security restriction. A Client in this state can't perform any application actions, but it can renew the previous identity session, retaining the same underlying identity.

Figure 12:
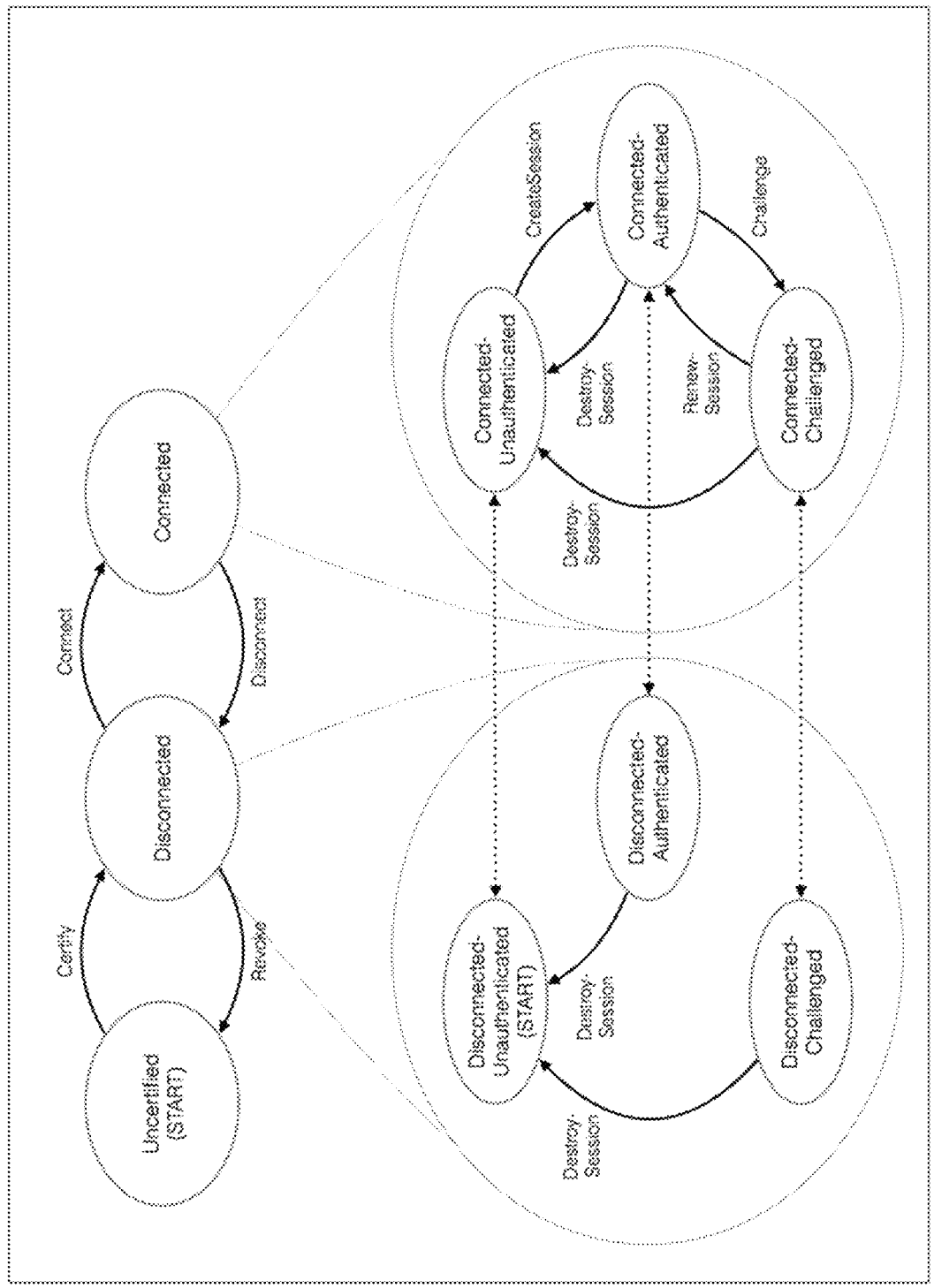
FIG. 12 illustrates a nested state diagram for both the Connection State and Authentication State logic.

The Connection State and Authentication State machines are largely independent. Connection State models the state of the TLS session, and Authentication State models the state of a user identity session, one or more of which can exist inside the context of a Connection State. However, Connection State can restrict available actions in Authentication State. In summary, in the Connected states, all allowed actions are available. When the Client is Disconnected, only DestroySession is available; as a result, Authenticated and Challenged can move to Unauthenticated, but no other transitions are available. FIG. 12 illustrates a nested state diagram for both the Connection State and Authentication State logic.

In an embodiment, the logic herein uses federated identities issued by an external Provider. A Client's external identity captured in the external Identity Token, which is a cryptographic object asserting a set of claims that are made by Provider regarding the Client. The external Identity Token is obtained from Provider before the Client calls the CreateSession action, using an out-of-band authentication request to Provider. In implementing that authentication request, the Provider may use any appropriate means; an example would be application logic that collects a login and password, submits these credentials to an existing back end authentication mechanism, then returns the external Identity Token. When generating the external Identity Token, in addition to its own credentials, the Provider may obtain a Nonce generated by Layer. In various embodiments, the Nonce can be obtained explicitly, by calling the GetNonce action, or as a side effect of an action that returns STATUS_NEW_SESSION_NEEDED and an accompanying Nonce; the latter approach can save a network round trip. In an embodiment, application logic submit these along with any external credentials to the Provider.

Figure 13:
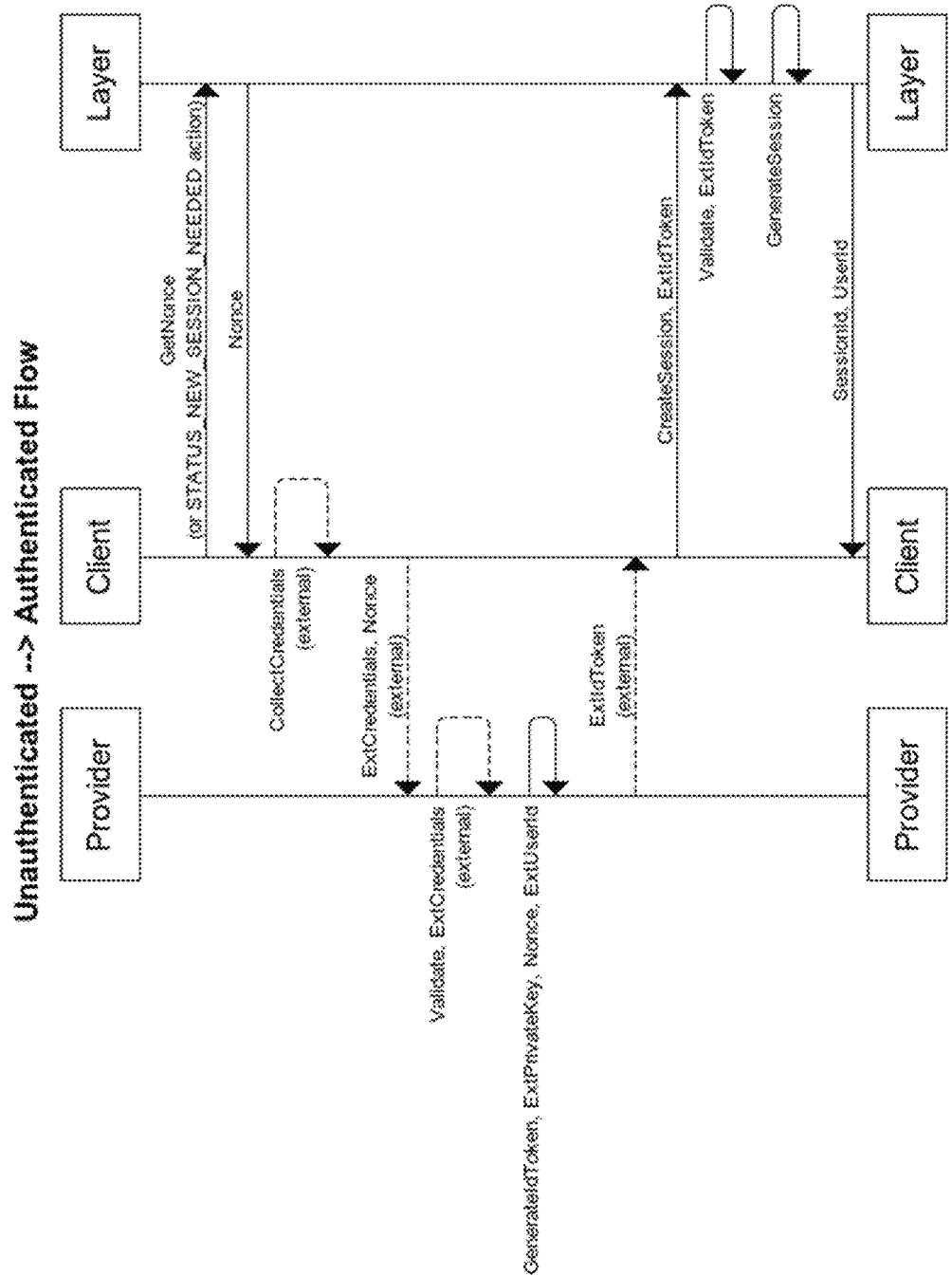
FIG. 13 illustrates an example authentication process.

FIG. 13 illustrates an example authentication process that elaborates on the foregoing descriptions in more detail. FIG. 13 presumes that before the process of FIG. 13 begins, the developer of the app 110 and Layer have undertaken a key exchange, registration and validation process by which Layer obtains a decryption key associated with the Provider that can be used to decrypt or validate encrypted tokens that the Provider later delivers. The particular mechanism used for the key exchange is not critical but could include, for example, exchange of public keys, followed by the Provider encrypting a long-lived session key using Layer's public key and sending a signed token containing that encrypted key to Layer, which decrypts it using Layer's private key.

As seen in FIG. 13, an Unauthenticated Client requests a nonce by calling the GetNonce action, or initiates an action that returns STATUS_NEW_SESSION_NEEDED. In reply, Layer generates a random or pseudo-random Nonce and provides it to Client. The Client then collects credentials from a user that relate to an external authentication provider; for example, app 110 may prompt a user to enter a username and password. The Client sends these credentials, with the Nonce, to the external Provider, which validates the credentials. If validation is successful, then the Provider generates an Identity Token that includes the Nonce and a user identifier for the user of the Client app 110; the Identity Token may be encrypted using the previously negotiated long-lived session key. The Provider returns the Identity Token to the Client, which does not use it but forwards the Identity Token to Layer with a CreateSession request. Layer then decrypts or otherwise validates the Identity Token and, if successful, generates a Session and binds the user identifier to a session identifier.

By this efficient, federated process, the Layer server computer 130 can establish a trust relationship with the user of the Client app 110 without managing passwords, tokens or other credentials of users. As a result, a large number of app developers can connect apps in a secure manner to Layer communications services without having to disclose user credentials to Layer. Further, this process permits initially creating a secure connection between Client and Layer, using SSL, TLS or another protocol, without having identity information for a user of the Client app 110; later, after the user has authenticated itself to a third-party Provider, user identifying information becomes bound to the Layer session and therefore to the secure connection.

In an embodiment, the following message header and payload definitions may be used. While the protocol actions set forth below are given in generic form, in practice, they should be bound to a particular transport (e.g., the Herald Thrift binding) in the idiomatic manner of that transport.

ACTIONS

| | Field | Type | Description |
|---|---|---|---|
| | | | Certify - Action |
| Request | csr | ByteArray | Certification request in Layer CSR format (see below) |
| Response | cert | ByteArray | Standard RFC 5280 (X.509) certificate in DER format |
| Notes | The Certify action validates a Client and issues a new TLS client certificate. | | |
| | | | GetNonce - Action |
| REQ | <NONE> | | |
| RES | status | Integer | zero for success, non-zero for failure |
| | nonce | ByteArray | A cryptographic nonce, to be used in a subsequent call to CreateSession |
| Notes | The GetNonce action obtains a new cryptographic nonce, for use in identifying a single authentication flow. Nonces are random and time bound, to avoid replay attacks. In addition to calling the GetNonce action, nonces can be obtained as a side effect of another action which fails with STATUS_NEW_SESSION_REQUIRED, and thus returns a nonce. | | |
| | | | CreateSession - Action |
| REQ | ext-id-token | String | External Identity Token in Layer EIT format (see below) |
| RES | status | Integer | Zero for success, non-zero for failure |
| | user-id | String | The Layer internal user id |
| | session-token | ByteArray | The Layer session token, to be used in subsequent actions to identify this session |
| NOTES | The CreateSession action creates a new external identity session within a connection. Multiple sessions can be active at once. | | |
| | | | ResumeSession - Action |
| REQ | user-id | String | The Layer internal user id, cached from a previous call to CreateSession |
| | session-token | ByteArray | The Layer session token, cached from a previous call to CreateSession |
| | | | CreateSession - Action |
| RES | status | Integer | Zero for success, non-zero for failure |

FORMATS
Layer CSR - Format

| | Field | Type | Description |
|---|---|---|---|
| Header | typ | String = "JWS" | JSON Web Signature |
| | cty | String = "layer-csr; v = 1 | Layer Certification Request, version 1 |
| | alg | String = "RS256" | Signature algorithm, RSASSA-PKCS-v1_5 using SHA-256 |
| Payload | uat | String | Layer User Agent |
| | prn | String | Layer Device ID (TBD; for now, client-generated UUID is OK) |
| | pka | String = "RSA" | Public key algorithm, RSA |
| | pky | Base64 String | Public key bytes |
| Notes | The Layer CSR format is used in the Certify action to specify the client parameters for certification. It is a string in JWS format, compact serialization. | | |

In another embodiment, rather than using an application-layer messaging protocol, authentication may be implemented in the transport layer using HTTP and SPDY. In such an approach, standard WWW-Authenticate & Authorization headers are used. On unauthorized requests, server replies with status 401, and WWW-Authenticate header containing realm and nonce fields. Then the Client retries with Authorization header containing identity-token field. On successful requests, server replies with status 200, and X-Layer-User-ID, X-Layer-Session-Token and X-Layer-Session-TTL headers, to be used as an optimization by the client. Thereafter, client can optimize by sending Authorization header containing only session-token field. An example is:

```
***** REQUEST ***** GET /nonce HTTP/1.1
***** RESPONSE ***** HTTP/1.0 401 Unauthorized WWW-Authenticate:
Layer
realm="donthardwireme.layer.com" nonce="uGrmKJv2u6hv2Xo9Ne86=="
    ***** REQUEST ***** GET /action HTTP/1.1 Authorization: Layer
realm="donthardwireme.layer.com" identity-
token="ewogICAgInR5cCI6ICJK...1V3fxxuBCj1DpQphoIAg"
    ***** RESPONSE ***** HTTP/1.0 200 OK X-Layer-User-ID: C2459744-31C7-
442D-B93D-17A46420752B X-Layer-Session-Token: pQilXCGBf9fCfxThSwStdQ,
X-Layer-Session-TTL: 86400
    ***** REQUEST ***** GET /action HTTP/1.1 Authorization: Layer session-
token="pQilXCGBf9fCfxThSwStdQ,"
    ***** RESPONSE ***** HTTP/1.0 200 OK X-Optimization-Headers: Not Sent
This Time
```

Client applications participate in authentication by calling specific server methods and implementing specific logic. In an embodiment, client certificates are used to establish TLS sessions. In an embodiment, when an app on a device uses the server logic for the first time, the app obtains a certificate signed by Layer to establish a herald connection. In one approach, the app is configured to generate CSR on the device and POST the CSR to an HTTP endpoint for this purpose. An example POST is:

POST auth.layer.com/certificates { "csr": "egaijseap3q2n3npa8jpa9jqwh38pq92j3p . . . "}

And returns:

OK { "certificate": "MIIHI21NLKN1231 . . . "}

The certificate may be provided in PEM format. In one approach, certificates are long lasting, but apps are configured to repeat the foregoing process if the TLS connection fails as unauthorized or because the certificate expired or was revoked. Once a TLS session is established, a nonce is used to assist in identifying the application session. In an embodiment, the nonce is a random or pseudo-random string that is provided by the server logic to uniquely identify and track the authentication flow.

```
string getNonce( ) throws (1:exceptions.PlatformException
    platformExc,
    2:exceptions.ApplicationException appExc)
```

In an embodiment, the nonce is sent to the provider to be incorporated into a signature that proves the identity of the app. This step may be implemented by the server logic exposing a hook or callback that developers complete when developing an app with the SDK.

public abstract String requestSignature(String nonce);

In an embodiment, the foregoing method is filled in with a request back to the app's existing back end authentication mechanism to obtain the signature as described in the specification; this process returns a string comprising JWT token, but from the SDK's perspective it can be treated as a black box.

A session with a new user then can be created. In an embodiment, two different ways to log in are provided, depending on whether or not the user has an account at the server computer. If the user does not have such an account, then the app is configured to create one.

```
data.Session createSession(1:string app_id, 2:string signature)
    throws
    (1:exceptions.PlatformException platformExc,
    2:exceptions.ApplicationException appExc)
```

In response, the server logic provides an AuthResponse containing the address of a new account and a session token for use to authenticate. The session token returned by createSession can be used to resume a previously created Session by directly authenticating with Herald. The app may be configured to handle an Authentication challenge when the app attempts this operation. As a client-side optimization, the app can check the expiration date of the Session before attempting to resume. In an embodiment, logging out deletes the access token, thus forcing a new signature.

5. VOIP Kit

In an embodiment, the communications logic implements a plurality of methods and function calls that communications applications may use to perform specified communications functions. In one embodiment, an example communications function is establishing a phone call between a calling party (a Caller) and a called party (a Callee). The methods and function calls may be packaged in a software development kit ("SDK" or "Kit" herein).

In one embodiment, a VoIP Call Establishment Process is implemented. In an embodiment, the Call Establishment Process starts using a STUN request to a publicly available STUN server that is located in the Layer Cloud Infrastructure. In response, the LYRVoipKit obtains its PUBLIC ADDRESS (that means globally routable unicast IP address) and port number. Simultaneously the LOCAL ADDRESS of the user's device is obtained from a networking interface device. Optionally LYRVoipKit can also send a TURN Allocation Request to a TURN server to retrieve a RELAYED ADDRESS.

When these addresses have been collected, a VoIPCallRequestMessage is composed, serialized and sent through the Layer System Messaging Channel to a Callee contact.

The caller device then generates a unique random alphanumeric security token (CALLER TOKEN) that is a part of VoIPCallRequestMessage. The VoIPCallRequestMessage is broadcast to all callee devices that are then currently logged in to the system.

In response to receiving a VoIPCallRequestMessage, the LYRVoIPKit at each callee's device initiates an address discovery procedure in the same manner described above for a Caller. When the addresses have been collected, the callee generates a security token (CALLEE TOKEN), serializes and sends a VoIPCallResponseMessage within a Layer System Message.

Approximately simultaneously, the callee sends STUN Binding Requests to all the addresses that it received via the VoIPCallRequestMessage. These requests start a UDP hole punching procedure. The STUN Binding Requests contain the CALLER TOKEN as the NONCE STUN Attribute.

After the VoIPCallResponseMessage is delivered to a LYRVoipKit on the caller's side, the caller sends STUN Binding Requests to all the callee's addresses.

When one or more of the STUN Binding Requests is received on the callee side or the caller side, the STUN server component of LYRVoIPKit performs steps as follows:

Match token from NONCE STUN Attribute with CALLEE or CALLER TOKEN received in VoIPCallRequest/ResponseMessage If no token is matched, silently discard the STUN Request.

If token is matched, then respond with a STUN Binding Success message.

Reception of the STUN Binding Success message on the caller side indicates that the UDP hole punching procedure succeeded, and thus a peer to peer IAX2 VoIP call can be established.

The caller originates an IAX2 call to all callee devices. Every call is originated with the IAX2 extension set to CALLEE TOKEN. If the LYRVoipKit at a callee receives a call to the IAX2 extension that does not match with any CALLEE TOKEN, then the call is rejected. Otherwise, the call is accepted.

In an embodiment, the first call that is picked up becomes the actual call, and any other receives a hang-up from the caller.

References: IAX2 Protocol spec—http://tools.ietf.org/html/rfc5456; STUN Protocol spec—http://tools.ietforg/html/rfc3489; http://tools.ietf.org/html/rfc5389; TURN Protocol spec—http://tools.ietf.org/html/rfc5766; State of Peer-to-Peer (P2P) Communication across Network Address Translators (NATs)—http://tools.ietforg/html/rfc5128

6. User Interface Kit

This section describes the design and implementation of an example of Layer UI logic 108, for use with APPLE IOS software. In an embodiment, There are currently three UI components that specified in this document as examples: Participant Picker—Presents a view for selecting participants in order to begin a conversation. Conversation List—Presents a list of all existing conversations for resuming communication on a previous conversation. Conversation View—Presents a view of all messages in a conversation that includes the ability to compose and send new messages.

In one embodiment, the participant picker component provides a scrollable, selectable, optionally searchable list of people that the user may wish to engage in a conversation. Unlike other components in the UI kit, this component is driven by an application defined data model (because Layer does not have an internal notion of users). Supports single and multiple selection modes. Provides support for asynchronously searching the list of participants. Integrates with an external model of a User/Contact API Example

```
/** @abstract The 'LYRUIParticipant' protocol must be adopted by objects wishing to represent
Layer participants in the user interface. */
@protocol LYRUIParticipant <NSObject>
/** @abstract The full name of the participant as it should be presented in the user interface. */
@property (nonatomic, readonly) NSString *fullName;
/**
@abstract The unique identifier of the participant as it should be used for Layer addressing.
@discussion This identifier is issued by the Layer identity provider backend.
*/
@property (nonatomic, readonly) NSString *participantIdentifier;
/**
@abstract Returns the avatar image of the receiver.
*/
@property (nonatomic, readonly) UIImage *avatarImage;
/**
@abstract Returns the text to be used for sectioning.
@discussion Typically the first name, last name, or company name is used for sectioning.
*/
@property (nonatomic, readonly) NSString *sectionText;
@end
/**
@abstract The 'LYRUIParticipantPresenting' protocol must be adopted by objects that wish to
present Layer
participants in the user interface.
*/
@protocol LYRUIParticipantPresenting <NSObject>
/**
@abstract Tells the receiver to present an interface for the given participant.
@param participant The participant to present.
*/
- (void)presentParticipant:(id<LYRUIParticipant>)participant;
@end
@protocol LYRUIParticipantPickerControllerDataSource,
LYRUIParticipantPickerControllerDelegate;
/**
@abstract The 'LYRUIParticipantPickerController' class presents a user interface that allows
the selection of one or more
Layer participants.
*/
@interface LYRUIParticipantPickerController : UINavigationController
///------------------------------------
/// @name Creating a Participant Picker
///------------------------------------
/**
@abstract Creates and returns a participant picker initialized with the given set of participants.
@param dataSource The data source managing a collection of 'LYRUIParticipant' objects with
which to drive the participant picker.
@returns A new participant picker initialized with the given data source.
```

```
@raises NSInvalidArgumentException Raised if any object in the set of participants returned by
the data source does not conform to the 'LYRUIParticipant' protocol.
*/
+
(instancetype)participantsPickerWithDataSource:(id<LYRUIParticipantPickerControllerDataSou
rce>)dataSource;
///----------------------------------------
/// @name Accessing the Picker Data Source & Delegate
///----------------------------------------
/**
@abstract The receiver's data source. Cannot be 'nil'.
*/
@property (nonatomic, weak, readonly) id<LYRUIParticipantPickerControllerDataSource>
dataSource;
/**
@abstract The receiver's delegate.
*/
@property (nonatomic, weak) id<LYRUIParticipantPickerControllerDelegate> delegate;
///---------------------------------
/// @name Configuring Picker Options
///---------------------------------
/**
@abstract A Boolean value that determines whether multiple participants can be selected at
once.
@discussion The defauly value of this property is 'YES'.
*/
@property (nonatomic, assign) BOOL allowsMultipleSelection;
/**
@abstract The table view cell class for customizing the display of participants.
@default '[LYRUIParticipantTableViewCell class]'
@raises NSInternalInconsistencyException Raised if the value is mutated after the receiver has
been presented.
*/
@property (nonatomic) Class<LYRUIParticipantPresenting> cellClass;
/**
@abstract Configures the height of each row in the receiver.
@default 44.0f
@raises NSInternalInconsistencyException Raised if the value is mutated after the receiver has
been presented.
*/
@property (nonatomic, assign) CGFloat rowHeight;
@end
/**
@abstract Objects wishing to act as the data source for a participant picker must adopt the
'LYRUIParticipantsPickerDataSource' protocol.
*/
@protocol LYRUIParticipantsPickerDataSource <NSObject>
/**
@abstract The set of participants to be presented in the picker. Each object in the returned
collection must conform to the 'LYRUIParticipant' protocol.
@discussion The picker presents the returned participants in alphabetical order sectioned by the
value returned by the 'sectionText' property.
*/
@property (nonatomic, readonly) NSSet *participants;
/**
@abstract Asynchronously searches for participants that match the given search text.
@discussion Invoked by the participant picker controller when the user inputs text into the
search bar. The receiver is
to perform the search, build a set of matching participants, and then call the completion block.
The controller will section
the participants using the value returned by the 'sectionText' property and present them in
alphabetical order.
*/
- (void)searchForParticipantsMatchingText:(NSString *)searchText completion:(void (^)(NSSet
*participants))completion;
@end
/**
@abstract The 'LYRUIParticipantPickerControllerDelegate' protocol must be adopted by
objects that wish to act
as the delegate for a 'LYRUIParticipantPickerController' object.
*/
@protocol LYRUIParticipantPickerControllerDelegate <NSObject>
/**
@abstract Tells the receiver that the participant selection view was dismissed without making a
selection.
@param participantSelectionViewController The participant selection view that was dismissed.
*/
- (void)participantSelectionViewControllerDidCancel:(LYRUIParticipantPickerController
*)participantSelectionViewController;
```

```
/**
@abstract Tells the receiver that the user has selected a set of participants from a participant
selection view.
@param participantSelectionViewController The participant selection view in which the
selection was made.
@param participants The set of participants that was selected.
*/
- (void)participantSelectionViewController:(LYRUIParticipantPickerController
*)participantSelectionViewController didSelectParticipants:(NSSet *)participants;
@end
/**
@abstract The 'LYRUIParticipantTableViewCell' class provides a lightweight, customizable
table
view cell for presenting Layer conversation participants.
*/
@interface LYRUIParticipantTableViewCell : UITableViewCell
<LYRUIParticipantPresenting>
// TODO: Add appropriate properties with UI Appearance selectors.
@end
```

The Conversation List component presents a scrollable, selectable, searchable list of conversations that the user may wish to re-engage with. The view is driven by Layer messaging models. Supports searching for conversations with messages matching text (requires new SDK support). Optionally supports editing of the conversations list (i.e. edit mode with multi-delete and swipe to delete). Supports the selection of a single conversation from the list. Performs live update when a new conversation is synchronized. Works with option for soft delete in the SDK.

API Example

```
@protocol LYRUIConversationListViewControllerDelegate;
/**
@abstract The 'LYRUIConversationListViewController' class presents an interface allowing
for the display, selection, and searching of Layer conversations.
*/
@interface LYRUIConversationListViewController : UINavigationController
///---------------------------------------
/// @name Initializing a Conversation List
///---------------------------------------
/**
@abstract Creates and returns a new conversation list initialized with the given Layer client.
@param layerClient The Layer client from which to retrieve the conversations for display.
@return A new conversation list controller.
*/
+ (instancetype)conversationListViewControllerWithLayerClient:(LYRClient *)layerClient;
/**
@abstract The delegate for the receiver.
*/
@property (nonatomic, weak) id<LYRUIConversationListViewControllerDelegate> delegate;
///---------------------------------------
/// @name Customizing the Conversation List
///---------------------------------------
/**
@abstract A Boolean value that determines if editing is enabled.
@discussion When 'YES', an Edit button item will be displayed on the left hand side of the
receiver's navigation item that toggles the editing state of the receiver.
@default 'YES'
@raises NSInternalInconsistencyException Raised if the value is mutated after the receiver has
been presented.
*/
@property (nonatomic, assign) BOOL allowsEditing;
/**
@abstract The table view cell class for customizing the display of the conversations.
@default '[LYRUIConversationTableViewCell class]'
@raises NSInternalInconsistency Exception Raised if the value is mutated after the receiver has
been presented.
*/
@property (nonatomic) Class<LYRUIConversationPresenting> cellClass;
/**
@abstract Sets the height for cells within the receiver.
@default '44.0'
@raises NSInternalInconsistencyException Raised if the value is mutated after the receiver has
been presented.
*/
@property (nonatomic, assign) CGFloat rowHeight;
@end
@protocol LYRUIConversationListViewControllerDelegate <NSObject>
/**
```

```
@abstract Tells the delegate that a conversation was selected from a conversation list.
@param conversationListViewController The conversation list in which the selection occurred.
@param conversation The conversation that was selected.
*/
- (void)conversationListViewController:(LYRUIConversationListViewController
*)conversationListViewController didSelectConversation:(LYRConversation *)conversation;
/**
@abstract Tells the delegate that the conversation list was dismissed without making a selection.
@param conversationListViewController The conversation list that was dismissed.
*/
- (void)conversationListViewControllerDidCancel:(LYRUIConversationListViewController
*)conversationListViewController;
/**
@abstract Asks the delegate for the Conversation Label for a given set of participants in a
conversation.
@param participants The identifiers for participants in a conversation within the conversation
list.
@param conversationListViewController The conversation list in which the participant appears.
@return The conversation label to be displayed for a given conversation in the conversation list.
*/
- (NSString *)conversationLabelForParticipants:(NSSet *)participants
inConversationListViewController:(LYRUIConversationListViewController
*)conversationListViewController;
@end
/**
@abstract The 'LYRUIConversationPresenting' protocol must be adopted by any view
component
that wishes to present a Layer conversation object.
*/
@interface LYRUIConversationPresenting <NSObject>
/**
@abstract Tells the receiver to present a given Layer Conversation.
@param conversation The conversation to present.
*/
- (void)presentConversation:(LYRConversation *)conversation;
@end
/**
@abstract The 'LYRUIConversationTableViewCell' class provides a lightweight, customizable
table
view cell for presenting Layer conversation objects.
*/
@interface LYRUIConversationTableViewCell : UITableViewCell
<LYRUIConversationPresenting>
@property (nonatomic) UIFont *titleFont UI_APPEARANCE_SELECTOR;
@property (nonatomic) UIColor *titleColor UI_APPEARANCE_SELECTOR;
@property (nonatomic) UIFont *subtitleFont UI_APPEARANCE_SELECTOR;
@property (nonatomic) UIColor *subtitleColor UI_APPEARANCE_SELECTOR;
@end
```

The Conversation List component provides an iMessage-like messaging experience for communicating with the participants in a Layer Conversation. Supports Person to Person or Group conversations. Support for sending messages. Supports the embedding of images/videos into new messages. Live updates in response to incoming messages. Supports "Load More" functionality when the top of history is reached but there is still unsynchronized content API Example

```
/**
Required Reading:
    *
https://developer.apple.com/library/ios/documentation/WindowsViews/Conceptual/CollectionVie
wPGforIOS
    * http://www.objc.io/issue-3/collection-view-layouts.html
    * https://github.com/objcio/issue-3-collection-view-layouts
    * http://skeuo.com/uicollectionview-custom-layout-tutorial
*/
@protocol LYRUIConversationViewControllerDataSource;
/**
Expectations:
    * Uses collection view
    * Messages are grouped into sections by time. When a new time period is encountered you
create a section. I'm guessing we use intervals of like 15-30 mins (maybe configurable)
*/
@interface LYRUIConversatioriViewController : UIViewController
+ (instancetype)conversationViewControllerWithConversation:(LYRConversation
*)conversation;
@property (nonatomic, weak) LYRUIConversationViewControllerDataSource *dataSource;
```

-continued

```
@property (nonatomic, readonly) LYRUIMessageInputToolbar *inputToolbar;
@property (nonatomic, assign) BOOL allowsEditing;
@end
@protocol LYRUIConversationViewControllerDataSource <NSObject>
- (id<LYRUIParticipant>)conversationViewController:(LYRUIConversationViewController
*)conversationViewController participantForIdentifier:(NSString *)participantIdentifier;
//nil suppresses the behavior?
- (NSString *)conversationViewController:(LYRUIConversationViewController
*)conversationViewController attributedStringForDisplayOfDate:(NSDate *)date;
- (NSString *)conversationViewController:(LYRUIConversationViewController
*)conversationViewController
attributedStringForDisplayOfRecipientStatus:(LYRRecipientStatus)recipientStatus;
@end
@protocol LYRUIMessagePresenting <NSObject>
- (void)presentMessage:(LYRMessage *)message
fromParticipant:(id<LYRUIParticipant>)participant;
@end
@interface LYRUIMessageCollectionViewCell : UICollectionViewCell
<LYRUIMessagePresenting>
// TODO: Define the UIAppearance enabled accessors
@end
@interface LURUIIncomingMessageCollectioriViewCell : LYRUIMessageCollectionViewCell
@end
@interface LURUIOutgoingMessageCollectionViewCell : LYRUIMessageCollectionViewCell
@end
@interface LYRUIMessageInputToolbar : UIToolbar
//auto-resizing message composition field
@property (nonatomic) UIMessageComposeTextView *textView;
// When set, draws to the left of the compose text area. Default to 'nil'
@property (nonatomic) UIButton *accessoryButton;
@end
//Auto-resizing. Support insertion of audio and videos?
@interface UIMessageComposeTextView : UITextView
- (void)insertImage:(UIImage *)image;
- (void)insertVideoAtPath:(NSString *)videoPath;
@end
/**
@discussion Lays out cells with the following rules:
    1. Participant avatar decoration views are draw to the left of incoming message cells.
    2. Header accessory views for the participant name are drawn above each incoming message
cell
    3. A date footer is drawn below each message whose next message occurred >= 15 mins
*/
@interface LYRUIConversationCollectionViewFlowLayout : UICollectionViewFlowLayout
@end
```

7. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
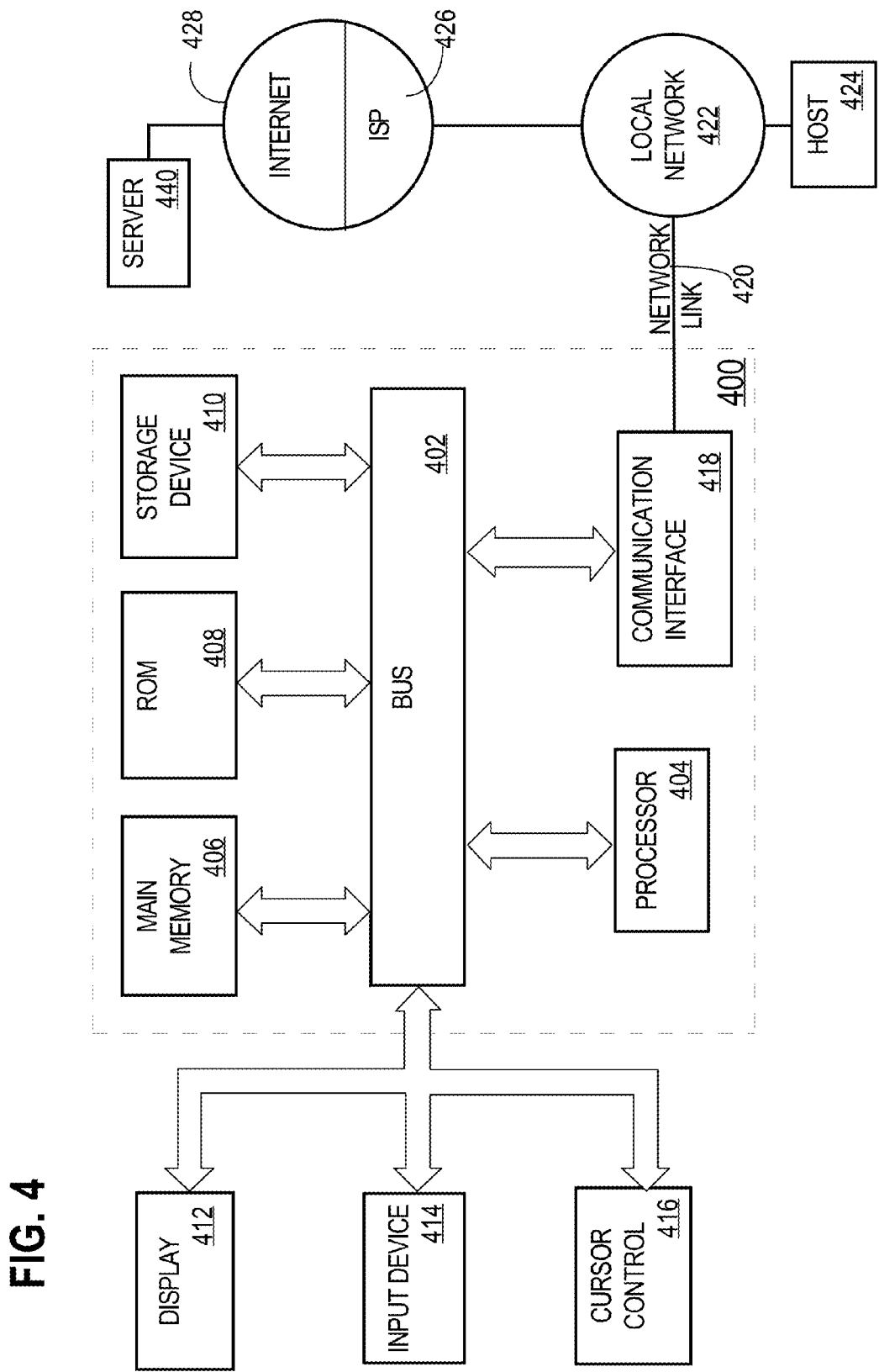
FIG. 4 illustrates a computer system with which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

APPENDIX 1

Android Example

Concepts

The Layer service introduces three concepts which facilitate all messaging. The concepts and their function are the following:

Conversations—represented by the Conversation object in the Layer SDK. Conversations coordinate all messaging within Layer. All messages sent with the Layer SDK are sent within the context of conversation, and all participants of that conversation will receives those messages.

Messages—represented by the Message object in the Layer SDK. Messages can be made up of one or many individual pieces of content.

Message Parts—represented by the MessagePart object in the Layer SDK. Message Parts are the atomic object in the Layer universe. They represent the individual pieces of content embedded with a message. MessageParts take a byte[ ] object and a MIME type string. The Layer SDK does not put any restrictions on the type of data you send, nor the MIME types your applications wishes to support.

```
// Creates and returns a new convertion object
with sample participant identifiers
Conversation conversation =
Conversation.newInstance(Arrays.asList("948374839"));
// Create a message part with a string of text
MessagePart messagePart = MessagePart.newInstance("text/plain",
"Hi, how are you?".getBytes( ));
// Creates and returns a new message object with the given
conversation and array of message parts
Message message = Message.newInstance(conversation,
Arrays.asList(messagePart));
//Sends the specified message
client.sendMessage(message);
```

Conversations

The Conversation object coordinates all messaging within the Layer service. It represents a stream of messages that are synchronized between all participants of a conversation. All messages sent with the Layer SDK must be sent within the context of a conversation. Conversation objects are created by calling Conversation.newInstance( ). This method takes a list of participant identifiers. As Layer Authentication allows you to represent users within the Layer service via your backend's federated identifier, participants are represented with those same user identifiers.

```
// Creates and returns a new conversation object with
sample participant identifiers
Conversation conversation =
Conversation.newInstance(Arrays.asList("USER-
IDENTIFIER"));
```

Add/Remove Participants

Once a conversation has been created, participant lists remain mutable, meaning participants can be both added and removed. The Layer service does not enforce any ownership, so any client can both add and remove participants.

```
// Adds a participant to a given conversation
client. addParticipants(conversation, Arrays.asList("948374848"));
// Removes a participant from a given conversation
client.removeParticipants(conversation,
Arrays.asList("948374848"));
```

Fetching Data

Layer Client exposes a simple API for fetching conversations for an authenticated user. In order to fetch all conversations, call getConversations( ).

```
// Returns a List of all conversations for the currently authenticated
user
List<Conversation> conversations = client.getConversations( );
```

Correspondingly, to fetch a specific conversation, that conversation's identifier must be passed.

```
// Returns a specific conversation
Conversation conversation =
   client.getConversation(someConversationIdentifier);
```

Deletion

The Layer SDK supports the deletion of both conversations and messages. Deletion of a conversation deletes that conversation object and all associated messages for all current participants.

```
// Deletes a messages.
layerClient.deleteMessage(message);
// Deletes a conversation,
layerClient.deleteConversation(conversation).
```

Fetching Data
Conversations

Layer Client exposes a simple API for fetching conversations for an authenticated user. In order to fetch all conversations, call getConversations( ).

```
// Returns a List of all conversations for the currently authenticated
user
List<Conversation> conversations = client.getConversations( );
```

Correspondingly, to fetch a specific conversation, that conversation's identifier must be passed.

```
// Returns a specific conversation
Conversation conversation =
   client.getConversation(someConversationIdentifier);
```

Please view the Layer Conversation Guide for a full tutorial on creating, displaying and updating conversations.
Fetching Messages Layer Client exposes a simple API for fetching all messages for a given conversation.

```
// Fetch all messages for a given conversation object
List<Message> messages = client.getMessages(conversation);
```

Initialization

The LayerClient object represents the primary interface for interacting with the Layer service. Only one instance of LayerClient should be instantiated by your application and should be retained at all times. The object is initialized with a Context, and Application Key, and an GCM Sender ID.

We have created an application for you titled <APP-NAME> and the sample code below contains your application's key.

This key is specific to your application and should be kept private at all times. Copy and paste the following code into your Application object's on Create( ) method.

```
// Instructions a LayerClient object
LayerClient client = LayerClient.newInstance(this,
   "<APPID>", "GCM ID");
```

You can create additional Layer applications by visiting our developer dashboard.
Listeners The LayerClient object leverages the listener pattern to notify your application to specific events. On launch, your application should register as a LayerConnectionListener and LayerAuthenticationListener.

client,registerConnectionListener(this).registerAuthenticationListener(this);
Connect The SDK Once you have registered your listeners, you connect the SDK

```
// Asks the LayerSDK to establish a network connection with the Layer
service client.connect( );
```

Installation

The Layer Android SDK is built using the new Android build system. The Android SDK is available via an AAR or JAR file hosted on Github (https://github.com/layerhq/releases-android). To install the SDK, perform the one of following (either for local JAR or remote AAR).

JAR (Downloaded to Local 'libs' Directory)

1. Download the 'layer-sdk-0.7.9.jar' JAR file from Github (https://github.com/layerhq/releases-android)
2. Drag the JAR file into the /libs directory of your Android Studio application
3. Navigate to the JAR file in Android Studio navigator, right click and select "Add As A Library . . . "
4. Navigate to your build.gradle file and ensure that you include the following:

```
apply plugin: 'maven'
dependencies {
    compile fileTree(dir: 'libs', include: ['*.jar'])
    compile 'com.android.support:appcompat-v7:20.+'
    compile 'com.android.support:support-annotations:20.+'
    compile 'com.google.android.gms:play-services:5.+'
    compile 'org.slf4j:slf4j-api:1.7.7'
}
```

AAR (with Layer 'git-repo' Gradle Plugin)

Navigate to your build.gradle file and ensure that you include the following:

```
apply plugin: 'maven'
dependencies {
    compile 'com.layer.sdk:layer-sdk:0.7.9'
    compile 'org.slf4j:slf4j-api:1.7.7'
}
```

Example AndroidManifest.xml

The Layer Android SDK requires some permissions and references from your app's AndroidManifest.xml file. These permissions allow the SDK to monitor network state and receive Google Cloud Messaging messages. Below is an example with a com.myapp.newstandalone package; replace with your own package when merging with your own manifest.

```xml
<?xml version="1.0" encoding="utf-8"?>
<manifest
    package="com.myapp.newstandalone"
    xmlns:android="http://schemas.android.com/apk/res/android">
    <!-- Layer SDK uses these for monitoring network state and receiving GCM -->
    <uses-permission android:name="android.permission.ACCESS_NETWORK_STATE"/>
    <uses-permission android:name="android.permission.GET_ACCOUNTS"/>
    <uses-permission android:name="android.permission.INTERNET"/>
    <uses-permission android:name="android.permission.READ_PHONE_STATE"/>
    <uses-permission android:name="android.permission.RECEIVE_BOOT_COMPLETED"/>
    <uses-permission android:name="android.permission.WAKE_LOCK"/>
    <uses-permission android:name="com.google.android.c2dm.permission.RECEIVE"/>
    <!-- GCM permission for your app (replace [com.myapp.newstandalone] with your package name) -->
    <permission android:name="com.myapp.newstandalone.permission.C2D_MESSAGE"
        android:protectionLevel="signature"/>
    <uses-permission
android:name="com.myapp.newstandalone.permission.C2D_MESSAGE"/>
    ...
    <application ... >
        <!-- Layer SDK has these for monitoring network, boot, and GCM -->
        <receiver android:name="com.layer.sdk.internal.receivers.LayerReceiver">
            <intent-filter>
                <actionandroid:name="android.net.conn.CONNECTIVITY_CHANGE"/>
                <actionandroid:name="android.intent.action.ANY_DATA_STATE"/>
                <actionandroid:name="android.intent.action.BOOT_COMPLETED"/>
            </intent-filter>
        </receiver>
        <receiver
            android:name="com.layer.sdk.internal.push.GcmBroadcastReceiver"
            android:permission="com.google.android.c2dm.permission.SEND">
            <intent-filter>
                <action android:name="com.google.android.c2dm.intent.RECEIVE"/>
                    <!-- Replace [com.myapp.newstandalone] with your package name -->
                <category android:name="com.myapp.newstandalone"/>
            </intent-filter>
        </receiver>
        <service android:name="com.layer.sdk.internal.push.GcmIntentService"/>
    </application>
</manifest>
```

Messages

The Message object represents an individual message within a conversation. A message within the Layer service can consist of one or many pieces of content, represented by the MessagePart object.

MessagePart

Layer does not place restrictions on the type of data you send through the service. As such, MessagePart objects are initialized with an Byte object and a MIME type string. The MIME Type simply describes the type of content the MessagePart contains.

The following demonstrates creating message parts with both text/plain and image/jpeg MIME types.

```
// Creates a message part with a string of next and text/plain MIME type.
String messageText = "Hi! How are you";
MessagePart messagePart = MessagePart.newInstance("text/plain",
messageText.getBytes( ));
// Creates a message part with an image
Bitmap imageBitmap = BitmapFactory.decodeResource(getResources( ),
R.drawable.back_icon);
ByteArrayOutputStream stream = new ByteArrayOutputStream( );
imageBitmap.compress(Bitmap.CompressFormat.JPEG, 100, stream);
byte[ ] imageData = stream.toByteArray( );
MessagePart messagePart = MessagePart.newInstance("image/jpeg",
imageData);
```

The MessagePart object also declares a convenience method for creating messages with text/plain MIME type:

```
String messageText = "Hi! How are you";
MessagePart messagePart = MessagePart.newInstance(messageText);
```

Your application can declare additional MIME types that it wishes to support. The following demonstrates sending location data.

```
// Creates a HashMap with latitude and longitude
HashMap location = new HashMap<String, String>( );
location.put("lat", "25.43567");
location.put("lon", "123.54383");
//Convert the location to data
ByteArrayOutputStream locationData = new ByteArrayOutputStream( );
ObjectOutputStream outputStream = new
ObjectOutputStream(locationData);
outputStream.writeObject(location);
MessagePart locationPart = client.newMessagePart("text/location",
locationData.toByteArray( ));
```

Message

Message objects are initialized with an array of MessagePart objects and a Conversation object. The object is created by calling newInstance( ). This creates a Message object that is ready to send.

Message message=Message.newInstance(conversation, Arrays.asList(messagePart))

Sending The Message

Once an Message object is initialized, it is ready for sending. The message is sent by calling sendMessage( ) on LayerClient.

```
// Sends the specified message
client.sendMessage(message);
```

Fetching Messages

Layer Client exposes a simple API for fetching all messages for a given conversation.

```
// Fetch all messages for a given conversation object
List<Message> messages = client.getMessages(conversation);
```

Metadata

Metadata is a flexible mechanism by which applications can attach contextually relevant information to conversations and messages. Applications do this by associating key-value stores of information, called metadata, to any Conversation or Message object. Layer supports two distinct types of metadata:

Participant Metadata—Information that is synchronized among participants in a Conversation.

Private Metadata—Information that is private to a given participant, but synchronized among all of their devices.

Metadata may be any mix of nested dictionaries, arrays, strings, booleans, integers, longs, doubles, or NULL.

```
// Adds metadata to an object
public abstract void mergeMetadata(Map<String, Parcelable>
metadata, Map<String,
Parcelable> userInfo, Object object);
// Removes any existing metadata for an object
public abstract void removeMetadata(List<String> metadataKeys,
List<String> userInfo Keys,
Object object);
```

The following demonstrates how to attach latitude and longitude info to a new conversation.

```
List<Conversation> conversation = client.getConversations(identifier);
HashMap metadata = new HashMap<String, String>( );
metadata.put("lat", "25.43567");
metadata.put("lon", "123.54383");
client.mergeMetadata(metadata, null, conversation);
```

A common use case for Private metadata is a Favorites feature. The following demonstrates how you could attach boolean metadata to implement a favorites feature.

```
List<Conversation> conversation = client.getConversations(identifier);
HashMap metadata = new HashMap<String, String>( );
location.put("favorite", true);
client.mergeMetadata(null, metadata, conversation);
```

What is claimed is:

1. A data processing method providing improved and efficient authentication of client computers by server computers, the method comprising:

using authentication logic of a server computer, establishing a secure socket connection with a first client computer that is executing a first application associated with a first provider computer, and a second client computer that is executing a second application associated with a second provider computer;

receiving, from the first application of the first client computer, a first request to use a communications service that is implemented at the server computer, and in response to the first request, determining that the first client computer is unauthenticated;

providing a nonce value to the first client computer;

receiving from the first client computer an encrypted identity token that includes the nonce and a user identifier, wherein the identity token has been encrypted using the first provider computer and an encryption key of the first provider computer, wherein the encryption key is known at the server computer;

validating the identity token and obtaining the user identifier therein;

creating and storing a session token that is uniquely associated with the first client computer and that includes a session identifier, the user identifier, and a binding to the secure socket connection;

receiving, from the second application of the second client computer, a second request to use the communications service that is implemented at the server computer;

by the server computer, providing the communications service to the first client computer for communication using the first application in response to the first request, and providing the communications service to the second client computer for communication using the second application in response to the second request, wherein the communications service comprises messaging, voice, or video.

2. The method of claim 1 wherein the secure socket connection comprises any of an Secure Sockets Layer (SSL) or Transport Layer Security (TLS) connection.

3. The method of claim 1 further comprising:
using software logic at the first client computer, obtaining one or more security credentials and providing the security credentials to the first provider computer;
using authentication logic at the first provider computer, validating the one or more security credentials, and if the validating is successful, creating the identity token that includes the nonce and the user identifier, encrypting the identity token using the encryption key, and providing the identity token to the first client computer.

4. The method of claim 3 further comprising, using the software logic at the first client computer, selecting the first provider computer from among a plurality of different authentication services provider computers that are configured to service the first client computer.

5. The method of claim 4 wherein each of the different authentication services provider computers is not owned, operated, controlled, or within a local network of a party that owns, operates, or controls the server computer.

6. The method of claim 3 further comprising downloading the software logic to the first client computer from the server computer, wherein the software logic comprises a software development kit (SDK) that is configured to call a plurality of methods of an application programming interface (API) that is implemented at the server computer, and wherein the authentication logic, the API and the SDK comprise a multi-layer complete stack of communications services that are associated with the server computer.

7. The method of claim 1 wherein the first provider computer is not owned, operated, controlled, or within a local network of a party that owns, operates, or controls the server computer.

8. The method of claim 1 wherein establishing the secure socket connection with the first client computer further comprises:
when first client computer connection credentials are in a cache, obtaining and using the first client computer connection credentials from the cache in establishing the secure socket connection;
when the first client computer connection credentials are not in the cache, generating a certificate signing request (CSR), posting the CSR, and using the posted CSR to form a digital certificate that contains the first client computer connection credentials;
associating the first client computer with a connected state and certified state when the secure socket connection is established without errors.

9. The method of claim 1 further comprising:
using the authentication logic, sending a challenge message to the first client computer with a new nonce value;
discarding the session token;
using the software logic at the first client computer, in response to the challenge message, re-performing the steps of claim 3 using the new nonce value.

10. One or more non-transitory computer-readable storage media storing one or more sequences of instructions which when executed by one or more computing devices cause performing a method providing improved and efficient authentication of client computers by server computers, the method comprising:
using authentication logic of a server computer, establishing a secure socket connection with a first client computer that is executing a first application associated with a first provider computer, and a second client computer that is executing a second application associated with a second provider computer;
receiving, from the first application of the first client computer, a request to use a communications service that is implemented at the server computer, and in response to the request, determining that the first client computer is unauthenticated;
providing a nonce value to the first client computer;
receiving from the first client computer an encrypted identity token that includes the nonce and a user identifier, wherein the identity token has been encrypted using the first provider computer and an encryption key of the first provider computer, wherein the encryption key is known at the server computer;
validating the identity token and obtaining the user identifier therein;
creating and storing a session token that is uniquely associated with the first client computer and that includes a session identifier, the user identifier, and a binding to the secure socket connection;
receiving, from the second application of the second client computer, a second request to use the communications service that is implemented at the server computer;
providing the communications service to the first client computer for communication using the first application in response to the first request, and providing the communications service to the second client computer for communication using the second application in response to the second request, wherein the communications service comprises messaging, voice, or video.

11. The media of claim 10 wherein the secure socket connection comprises any of an Secure Sockets Layer (SSL) or Transport Layer Security (TLS) connection.

12. The media of claim 10 further comprising instructions which when executed cause:
using software logic at the first client computer, obtaining one or more security credentials and providing the security credentials to the first provider computer;
using authentication logic at the first provider computer, validating the one or more security credentials, and if the validating is successful, creating the identity token that includes the nonce and the user identifier, encrypting the identity token using the encryption key, and providing the identity token to the first client computer.

13. The media of claim 12 further comprising instructions which when executed cause, using the software logic at the first client computer, selecting the first provider computer from among a plurality of different authentication services provider computers that are configured to service the first client computer.

14. The media of claim 13 wherein each of the different authentication services provider computers is not owned, operated, controlled, or within a local network of a party that owns, operates, or controls the server computer.

15. The media of claim 12 further comprising instructions which when executed cause downloading the software logic to the first client computer from the server computer, wherein the software logic comprises a software development kit (SDK) that is configured to call a plurality of methods of an application programming interface (API) that is implemented at the server computer, and wherein the authentication logic, the API and the SDK comprise a multi-layer complete stack of communications services that are associated with the server computer.

16. The media of claim 10 wherein the first provider computer is not owned, operated, controlled, or within a local network of a party that owns, operates, or controls the server computer.

17. The media of claim 10 wherein the instructions which when executed cause establishing the secure socket connection with the first client computer further comprise instructions which when executed cause:

when first client computer connection credentials are in a cache, obtaining and using the first client computer connection credentials from the cache in establishing the secure socket connection;

when the first client computer connection credentials are not in the cache, generating a certificate signing request (CSR), posting the CSR, and using the posted CSR to form a digital certificate that contains the first client computer connection credentials;

associating the first client computer with a connected state and certified state when the secure socket connection is established without errors.

18. The media of claim 10 further comprising instructions which when executed cause:

using the authentication logic, sending a challenge message to the first client computer with a new nonce value;

discarding the session token;

using the software logic at the first client computer, in response to the challenge message, re-performing the steps of claim 3 using the new nonce value.

* * * * *